(12) United States Patent
Perreault et al.

(10) Patent No.: US 10,090,772 B2
(45) Date of Patent: Oct. 2, 2018

(54) RESONANT POWER CONVERTERS USING IMPEDANCE CONTROL NETWORKS AND RELATED TECHNIQUES

(71) Applicant: MASSACHUSETTS INSTITUTE OF TECHNOLOGY, Cambridge, MA (US)

(72) Inventors: David J. Perreault, Brookline, MA (US); Khurram K. Afridi, Lexington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 13 days.

(21) Appl. No.: 14/382,765

(22) PCT Filed: Mar. 7, 2013

(86) PCT No.: PCT/US2013/029729
§ 371 (c)(1),
(2) Date: Sep. 4, 2014

(87) PCT Pub. No.: WO2013/134573
PCT Pub. Date: Sep. 12, 2013

(65) Prior Publication Data
US 2015/0023063 A1 Jan. 22, 2015

Related U.S. Application Data

(60) Provisional application No. 61/608,375, filed on Mar. 8, 2012.

(51) Int. Cl.
*H02M 3/335* (2006.01)
*H02M 3/337* (2006.01)
*H02M 1/00* (2006.01)

(52) U.S. Cl.
CPC ....... *H02M 3/33569* (2013.01); *H02M 3/335* (2013.01); *H02M 3/337* (2013.01);
(Continued)

(58) Field of Classification Search
CPC ............. H02M 3/335; H02M 3/33507; H02M 3/33569; H02M 3/337; H02M 3/3376; H02M 2001/0058
See application file for complete search history.

(56) References Cited

U.S. PATENT DOCUMENTS 3,675,037 A 7/1972 Hamilton
4,805,081 A 2/1989 Chambers et al.
(Continued)

OTHER PUBLICATIONS

U.S. Appl. No. 14/968,045, filed Dec. 14, 2015, Perreault et al.
(Continued)

*Primary Examiner* — Yusef A Ahmed
*Assistant Examiner* — Ishrat Jamali
(74) *Attorney, Agent, or Firm* — Daly, Crowley, Mofford & Durkee, LLP

(57) ABSTRACT

An impedance control resonant power converter (converter) operated at a fixed switching frequency includes an impedance control network (ICN) coupled between two or more inverters operated at a fixed duty ratio with a phase shift between them and one or more rectifiers. The phase shift is used to control output power or compensate for variations in input or output voltage. The converter operates at fixed frequency yet achieves simultaneous zero voltage switching (ZVS) and zero or near zero current switching (ZCS) across a wide operating range. Output power may be controlled by: (1) changing phase shift between inverters; or (2) adjusting phase shift between inverters depending upon input and/or output voltages so that an admittance presented to the inverters is conductive and then turning the converter on and
(Continued)

off at a frequency lower than the converter switching frequency to control output power below a value set by the phase shift.

27 Claims, 17 Drawing Sheets

(52) U.S. Cl.
CPC ..... *H02M 3/3376* (2013.01); *H02M 3/33507* (2013.01); *H02M 3/33576* (2013.01); *H02M 2001/0003* (2013.01); *H02M 2001/0058* (2013.01); *Y02B 70/1433* (2013.01); *Y02B 70/1491* (2013.01)

(56) References Cited

U.S. PATENT DOCUMENTS

| | | | |
|---|---|---|---|
| 5,065,300 A | 11/1991 | Jacobson et al. | |
| 5,969,484 A | 10/1999 | Santi et al. | |
| 7,535,133 B2 | 5/2009 | Perreault et al. | |
| 7,589,605 B2 | 9/2009 | Perreault et al. | |
| 7,889,519 B2 | 2/2011 | Perreault et al. | |
| 7,973,497 B2 * | 7/2011 | Nishida | H05B 41/2828 315/209 R |
| 8,026,763 B2 | 9/2011 | Dawson et al. | |
| 8,212,541 B2 | 7/2012 | Perreault et al. | |
| 8,451,053 B2 | 5/2013 | Perreault et al. | |
| 8,718,188 B2 | 5/2014 | Balteanu et al. | |
| 8,824,978 B2 | 9/2014 | Briffa et al. | |
| 8,829,993 B2 | 9/2014 | Briffa et al. | |
| 8,830,710 B2 | 9/2014 | Perreault et al. | |
| 9,118,259 B2 * | 8/2015 | Ye | H02M 7/493 |
| 2001/0009516 A1 * | 7/2001 | Kato | H02M 1/34 363/17 |
| 2005/0047183 A1 | 3/2005 | Kurio et al. | |
| 2005/0286278 A1 | 12/2005 | Perreault et al. | |
| 2008/0298093 A1 | 12/2008 | Jin et al. | |
| 2009/0160352 A1 | 6/2009 | Nishida et al. | |
| 2009/0196072 A1 | 8/2009 | Ye | |
| 2009/0303753 A1 | 12/2009 | Fu et al. | |
| 2011/0080056 A1 | 4/2011 | Low et al. | |
| 2011/0128758 A1 | 6/2011 | Ueno et al. | |
| 2011/0242864 A1 | 10/2011 | Satou | |
| 2013/0241625 A1 | 9/2013 | Perreault et al. | |
| 2014/0120854 A1 | 5/2014 | Briffa et al. | |
| 2014/0167513 A1 | 6/2014 | Chang et al. | |
| 2014/0313781 A1 | 10/2014 | Perreault et al. | |
| 2014/0339918 A1 | 11/2014 | Perreault et al. | |
| 2014/0355322 A1 | 12/2014 | Perreault et al. | |
| 2015/0084701 A1 | 3/2015 | Perreault et al. | |

OTHER PUBLICATIONS

U.S. Appl. No. 14/974,563, filed Dec. 18, 2015, Perreault et al.
U.S. Appl. No. 14/975,742, filed Dec. 19, 2015, Perreault et al.
U.S. Appl. No. 14/416,654, filed Jan. 23, 2015, Perreault, et al.
U.S. Appl. No. 14/416,737, filed Feb. 11, 2015, Perreault, et al.
U.S. Appl. No. 14/401,981, filed Nov. 18, 2014, Perreault.
U.S. Appl. No. 14/435,914, filed Apr. 15, 2015, Perreault, et al.
U.S. Appl. No. 14/758,033, filed Jun. 26, 2015, Perreault, et al.
U.S. Appl. No. 14/791,685, filed Jul. 6, 2015, Perreault, et al.
PCT International Search Report of the ISA for PCT/US2013/029729 dated May 28, 2013.
PCT Written Opinion of the ISA for PCT/US2013/029729 dated May 28, 2013.
PCT International Preliminary Report on Patentability of the ISA for PCT/US2013/029729 dated Sep. 18, 2014.
U.S. Appl. No. 14/837,616, filed Aug. 27, 2015, Briffa, et al.
U.S. Appl. No. 14/823,220, filed Aug. 11, 2015, Barton, et al.
U.S. Appl. No. 14/934,760, filed Nov. 6, 2015, Briffa, et al.
U.S. Appl. No. 14/920,031, filed Oct. 22, 2015, Briffa, et al.
U.S. Appl. No. 15/149,491, filed May 9, 2016, Perreault, et al.
U.S. Appl. No. 15/290,402, filed Oct. 11, 2016, Perreault, et al.
U.S. Appl. No. 15/287,068, filed Oct. 6, 2016, Briffa, et al.
U.S. Appl. No. 15/354,170, filed Nov. 17, 2016, Briffa, et al.

* cited by examiner

RESONANT POWER CONVERTERS USING IMPEDANCE CONTROL NETWORKS AND RELATED TECHNIQUES

This application is a U.S. National Stage entry under 35 U.S.C. § 371 of PCT Application No. PCT/US2013/029729, filed Mar. 7, 2012 and published in the English language and, which claims the benefit of U.S. provisional application No. 61/608,375 filed Mar. 8, 2012, which applications are hereby incorporated herein by reference in their entireties.

BACKGROUND

As is known in the art, some important objectives in the design of power electronic converters are high efficiency and high power density (i.e., small size and mass), as well as the ability to maintain these efficiencies across wide operating ranges of output power and input voltage and/or output voltage.

As is also known, power density can be increased by increasing the switching frequency of a converter. To achieve high efficiencies at high power densities, power converters must operate using so-called "soft-switching" techniques—either a zero voltage switching (ZVS) technique and/or zero current switching (ZCS) technique, for example. In ZVS, a transistor voltage is constrained close to zero when switching on or off. In ZCS, a transistor current is constrained close to zero when switching on or off. Without soft switching, transistor switching loss prevents high efficiency from being obtained and also limits power density (owing to the need to operate at low switching frequencies).

Unfortunately, while available soft-switching power converters can achieve high efficiencies under specific operating conditions, performance tends to degrade greatly when considering requirements of operation across varying input voltage, output voltage and power levels. In particular, with conventional circuit designs and control methods, it is difficult to maintain desirable circuit waveforms (e.g., ZVS/ZCS switching, minimum conduction current, etc.) as power is reduced from maximum and as the input voltage or output voltage vary from nominal. This challenge in maintaining high efficiency is tied to both the circuit design and the control methodology.

To understand this challenge, consider some widely-used design and control techniques. Referring now to FIG. 1, one common means of controlling resonant soft-switched inverters (e.g., series, parallel, series-parallel converters, etc.) is frequency control, in which the output voltage is regulated in the face of load and voltage variations by modulating the converter switching frequency. Because of the inductive loading requirements to achieve ZVS switching, power is reduced in such converters by increasing switching frequency, exacerbating switching loss. Wide frequency operation also makes design of magnetic components and EMI filters more challenging. Moreover, depending upon resonant tank design, circulating currents in the converter may not back off with power, reducing power transfer efficiency.

Referring now to FIG. 1A, an alternative method of control that can be applied to bridge converters at fixed frequency is phase-shift control. In phase shift control techniques, the relative timing of multiple inverter legs are modulated to control power. However, conventional full-bridge resonant converters using phase shift control suffer from asymmetric current levels between the two inverter legs at the switching instants as the legs are outphased to reduce output power. The result is that the transistors in the leading inverter leg start to turn-off at large currents. Also, as outphasing is increased further the transistors in the lagging inverter leg lose ZVS turn-on capability. These factors result in extra losses and lead to lower converter efficiency at partial loads, and consequently to poor design tradeoffs.

Other fixed frequency control techniques, such as asymmetrical clamped mode control and asymmetrical pulse width control, have also been developed. However, these also lose zero voltage switching (ZVS) capability as the output power is reduced. Hence, they also do not maintain high efficiency across a wide load range.

Other more complicated designs have also been tried to solve the problem of achieving high efficiencies across varying input voltage, output voltage and power levels with limited success. There is, therefore, a need for converter designs and associated controls that can provide reduced loss when operating over wide voltage and power ranges.

SUMMARY

Described herein are concepts, systems, circuits and techniques for converter designs and associated controls which allow efficient operation over wide input voltage, output voltage and power ranges.

As described herein below, concepts, systems, circuits and techniques described herein can be used to provide a variety of different circuits and systems including, power converters, switched-mode rectifiers and including but not limited to impedance control resonant (ICR) dc/dc converters, ICR inverters and ICR rectifiers.

In accordance with one aspect of the concepts, systems, circuits and techniques described herein, an impedance control resonant (ICR) dc/dc converter includes an impedance control network coupled between at least two inverter circuits and at least one rectifier circuit. The inverters are coupled to the converter input and the rectifier(s) are coupled to the converter output. The phase angle between the inverters is adjusted to control output power or compensate for input or output voltage variations. The impedance control network combines power from the inverters in a manner such that as the phase angle among inverters is adjusted, low-loss switching of the inverter circuits is maintained.

With this particular arrangement, an impedance control resonant (ICR) high frequency dc/dc converter is provided. The impedance control network is ideally lossless. By modifying a phase angle between the inverters, the impedance control network presents a highly resistive effective impedance at the inputs thereof which enables switching of the inverters at relatively low loading current. It should be appreciated that in different contexts, the phrase "highly resistive" can having different meanings. In some cases, for example, it may simply mean less than, about 30 degrees of phase shift from resistive. In other cases, such as with bumps control for example, it may mean less than about 5 degrees. In general, the phrase "highly resistive" may mean that the impedance has zero or a relatively small reactive component. In some contexts, the phrase "highly resistive" may mean purely or near purely resistive (i.e., the impedance has zero, or near zero, reactive component).

It should thus be appreciated that the technique described herein thus enables zero or near zero current switching of the inverters. Also, owing to the operating characteristics, loss reduces with power, enabling high efficiency over a wide load range. In some embodiments, the ICR converters can include more than two inverters and one rectifier and the impedance control network modifies a phase angle between each of the inverters to present to each inverter a highly resistive effective impedance at the inputs of the impedance control network.

In accordance with a further aspect of the concepts, systems, circuits and techniques described herein an impedance control resonant (ICR) dc/dc converter having a converter input and a converter output, the ICR dc/dc converter comprises a plurality of inverters each of said plurality of inverters having an input and coupled to the converter input and each of said plurality of inverters having an output and one or more rectifiers each of said rectifier(s) having an input and each of said rectifier(s) having an output coupled to the converter output. The ICR dc/dc converter further comprises an impedance control network coupled between the plurality of inverters and the one or more rectifiers wherein the impedance control network controls the loading seen by each of the plurality of inverters such that the effective impedances at the inputs of the impedance control network are highly resistive at the fundamental frequency as the phase angle(s) between inverters are adjusted to control output power and/or compensate for input and output voltage variations. The impedance control network causes the inverters to interact such that the switching frequency components of the individual inverter currents remain relatively close in phase to the corresponding individual inverter switching frequency voltages as the relative inverter phase angles change over a specified operating range, such that the inverter switches commutate at currents that are low compared to their peak currents.

With this particular arrangement, an impedance control resonant (ICR) high frequency dc/dc converter is provided. Providing a highly resistive effective impedance at the inputs of the impedance control network enables switching of the inverters at relatively low loading current. This technique thus enables zero or near zero current switching of the inverters. Furthermore, by modifying the impedance control network for slight inductive loading of the inverters, one can realize zero voltage and zero or near zero current switching.

In accordance with a still further aspect of the concepts, systems, circuits and techniques described herein, a power converter comprises a plurality of inverters each of said plurality of inverters having an input and coupled to the converter input and each of said plurality of inverters having an output and one or more rectifiers each of said rectifiers having an input and each of said rectifiers having an output coupled to the converter output. The power converter further comprises an asymmetric combining structure disposed to provide effective impedances at the inputs of the asymmetric combining structure that are highly resistive at a fundamental switching frequency of the power converter as a phase angle between each of the plurality of inverters is modified to control output power or compensate for input or output voltage.

With this particular arrangement, a power converter is provided which operates at relatively high switching frequencies. Thus, a power converter having a relatively high power density is provided. Since power converters described herein have high power densities, the power converters have a size and mass which is relatively small compared with conventional power converters for like applications.

Increasing the switching frequency at which the power converter can operate results in power electronics having a reduced size and mass compared with conventional power electronics.

At the same time, however, power converters provided in accordance with the concepts described herein do not suffer from increased switching losses which is typically the result of increasing the switching frequency. Thus, power converters provided in accordance with the concepts described herein operate at switching frequencies higher than prior art approaches while at the same time having high converter efficiency as well as a smaller size and mass than conventional power converters.

The resonant power converter architecture described herein uses lossless impedance control networks and associated controls that allow zero voltage switching and near zero current switching (or pure zero current switching) over a wide operating range and hence achieve very high efficiency. The resonant power converter architecture incorporates lossless networks that draw upon the concepts of lossless power combiners and resistance compression networks. This network introduces differences in reactive (or susceptive) impedances loading two or more inverters that compensates in whole or in part for the reactive loading owing to the influence the inverters have on one another under phase shift control, effectively having the effective input impedances of the impedance control networks look highly resistive at the fundamental frequency and enabling switching of the inverters at low loading current. The effective input resistance varies with phase shift, enabling power control. This technique enables zero current switching of the inverters. By incorporating or modifying the networks for slight inductive loading of the inverters, one can realize slightly inductive impedance and hence allow zero voltage and near zero current switching. The impedance control network may incorporate a resonant tank, may also incorporate an isolation transformer and may also incorporate transmission lines, matching networks and/or non-reciprocal components (such as circulators).

In one embodiment, the converter comprises two inverters and is operated at a fixed (or narrow range) switching frequency and each inverter is operated at a fixed duty ratio (approximately 50%). The two inverters are operated with a phase shift between them. Output power is controlled by controlling this phase shift. With an appropriate impedance control network the susceptance seen by the two inverters can be made constant as a function of output power, negative (i.e., inductive) and arbitrarily small for the designed input and output voltages. Hence, the input admittance seen by the inverters can be made purely conductive across the full output power range at the designed input and output voltage, and predominantly conductive even with a reasonably wide variation in input and output voltage.

In accordance with a further aspect of the concepts, systems, circuits and techniques described herein a resonant power converter circuit includes an impedance control resonant (ICR) dc/dc converter includes an impedance control network coupled between a plurality of inverter circuits and one or more rectifier circuits. The inverters are coupled to the converter input and the rectifiers are coupled to the converter output. The impedance control network responds to variations of phase angle between the inverters to control output power while at the same time maintaining low-loss switching. The converter further comprises a burst mode controller which operates the converter in accordance with a burst mode control strategy in which the operation of the converter is modulated on and off at a frequency lower than its switching frequency.

With this particular arrangement, a resonant power converter architecture that operates at fixed frequency yet achieves simultaneous zero voltage switching (ZVS) and near zero current switching (ZCS) of the transistors across a wide operating range is provided. These advantages can be achieved with fixed duty ratio of individual switches. By using a fixed duty ratio of individual switches, it is possible to increase switching frequency (hence reducing size and mass) while achieving very high efficiency, and/or to scale designs at conventional frequencies for extreme high-efficiency operation. Furthermore, using a fixed duty ratio of individual switches also enables effective resonant gating. The combination of ZVS/near-ZCS with resonant gating changes the loss tradeoffs encountered in pulse width modulation (PWM) and conventional soft-switching designs, and enables design scaling into new areas providing better combinations of size and loss.

The resonant power converter architecture described herein utilizes novel ideally lossless impedance control networks and associated controls that allow zero voltage switching and near zero current switching (or pure zero current switching) over a wide operating range and hence enables very high efficiency to be achieved. The system described here includes attributes that further enhance achievable performance, especially for wide input voltage and power range operation. As described below, in one embodiment, the converter is operated with a special Burst-Mode Phase-Shift (or "BuMPS") control in order to achieve high performance. This architecture incorporates lossless networks that draw upon the concepts of lossless power combiners and resistance compression networks. This network introduces differential phase shift in the operation of two or more inverters, essentially having the effective impedances seen at the inputs of the impedance control network look highly resistive at the fundamental frequency and enabling switching of the inverters at low loading current. This technique enables zero current switching of the inverters. By modifying the networks for slight inductive loading of the inverters, one can realize zero voltage and near zero current switching.

An Impedance control resonant (ICR) power converter includes an impedance control network (ICN) coupled between two or more inverters and one or more rectifiers. The ICR power converter is operated at a fixed switching frequency and the inverters are operated at a fixed duty ratio with a phase shift between them. The phase shift is used to control output power or compensate for variations in input or output voltage. In this way, an ICR power converter that operates at fixed frequency yet achieves simultaneous zero voltage switching (ZVS) and zero or near zero current switching (ZCS) across a wide operating range is provided. In one set of embodiments, because of the presence of the impedance control network, the susceptance seen by (or presented to) each inverter can be made constant as a function of output power, negative (i.e., inductive) and arbitrarily small for the designed input and output voltages. Hence, the input admittance seen by the inverters can be made purely conductive across the full output power range at the designed input voltage; and predominantly conductive even with a reasonably wide variation in input voltage. For these embodiments output power can be controlled by changing the phase shift between the inverters while achieving simultaneous zero voltage switching (ZVS) and zero or near zero current switching (ZCS) for all the switches across a wide output power operating range. In an alternate control technique, for these and additional embodiments, the phase shift is adjusted depending on input voltage and output voltage so that the admittance seen by the inverters is purely (or near purely) conductive. In this strategy, output power is controlled below the value set by the phase shift by turning the converter on and off at a frequency lower than the switching frequency of the converter. Now simultaneous zero voltage switching (ZVS) and zero or near zero current switching (ZCS) can be achieved across a wide output power, input voltage and output voltage operating range. These advantages can be achieved with fixed duty ratio of individual switching elements which allows use of relatively high switching frequencies (hence reducing size and mass) while achieving very high efficiency, and/or to scale designs at conventional frequencies for extreme high-efficiency operation. This technique also enables effective resonant gating. The combination of ZVS/near-ZCS with resonant gating changes the loss tradeoffs encountered in PWM and conventional soft-switching designs, and enables design scaling into new areas providing better combinations of size and loss.

The concepts and techniques described herein can also be used to provide a switched-mode rectifier. For example, a switched-mode rectifier may include a plurality of inverters, one or more rectifiers and an impedance control network (ICN) having a plurality of inputs each coupled to a corresponding output of the plurality of inverters and having one or more outputs each coupled to a corresponding input of the one or more rectifiers.

BRIEF DESCRIPTION OF THE DRAWINGS

The foregoing and other objects, features and advantages of the concepts, systems and techniques described herein will be apparent from the following description of particular embodiments of the concepts, systems and techniques described herein, as illustrated in the accompanying drawings in which like reference characters refer to the same parts throughout the different views. The drawings are not necessarily to scale, emphasis instead being placed upon illustrating the principles of the concepts, systems, circuits and techniques described herein.

DETAILED DESCRIPTION

Figures 1, 1A:
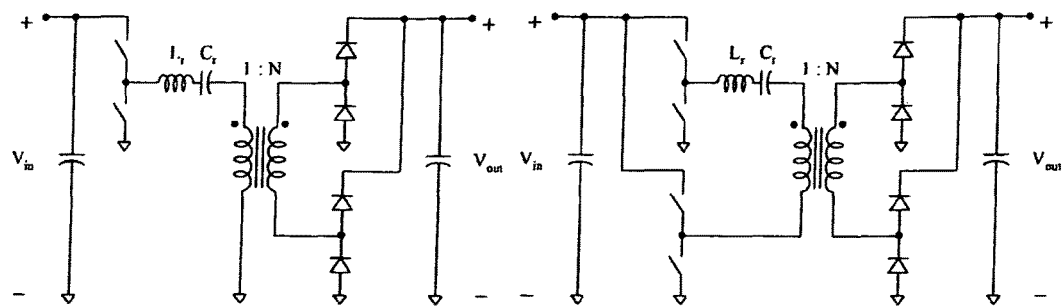
FIG. 1 is a schematic diagram of a conventional half-bridge series resonant dc/dc converter which utilizes frequency control.
FIG. 1A is a schematic diagram of a conventional full-bridge series resonant dc/dc converter which utilizes phase shift control.

Described herein is a resonant power converter architecture that operates at fixed frequency yet achieves simultaneous zero voltage switching (ZVS) and near zero current switching (ZCS) of the transistors across a wide operating range. Alternatively, pure ZCS can be achieved over a wide operating range. These advantages can be achieved with fixed duty ratio of individual switches. This allows one to increase the switching frequency (hence reducing size and mass) while achieving very high efficiency, and/or to scale designs at conventional frequencies for extreme high-efficiency operation. This technique also enables effective resonant gating. The combination of ZVS/near ZCS with resonant gating changes the loss tradeoffs encountered in pulse width modulation (PWM) and conventional soft-switching designs, and enables design scaling into new areas providing better combinations of size and loss.

It should be appreciated that reference is sometimes made herein to specific exemplary implementations of converter circuits or the use of converter circuits in a particular application. After reading the description provided herein, those of ordinary skill in the art will appreciate that the concepts and techniques described herein may be used in a wide variety of circuit implementations. Those of ordinary skill in the art will also appreciate that converter circuits find application in a wide variety of different applications. For example, many applications exist in which a converter is used including but not limited to dc-dc converters, such as for supplying electronic loads, lighting, computers, communications devices, for providing voltage conversion in dc power distribution systems or data centers, and for interfacing to energy storage devices, vehicles and renewable sources Coupled with a rectifier at the input, this can also be applied for high-performance rectification, such as for supplying electronic loads, lighting, computers, communications devices, vehicle or battery chargers and similar applications. It should thus be recognized that the concepts, systems, circuits and techniques described herein can be used in these applications to achieve one or more of: higher energy density/smaller size at a given voltage variation level, higher reliability, achieving high efficiencies across varying input voltage, output voltage and power levels (i.e. providing reduced loss when operating over wide voltage and power ranges).

It should also be appreciated that reference is made herein to an impedance control network (ICN). In connection with some circuits described herein below, examples of specific implementations of impedance control networks are provided. It should be appreciated that such specific examples are provided to promote clarity in the text and drawings and the description of the concepts described herein. Such examples are not intended as, and should not be construed as limiting. It should be understood that an impedance control network may be provided by any set of ideally lossless components.

It should also be appreciated that while reference is made herein to exemplary circuits illustrated with conventional half-bridge inverters and rectifiers, other inverter and rectifier topologies may, or course, also be used. These include, but are not limited to class DE, E, F, Phi, Phi2, E/F inverters, current-source or z-source inverters among others. Likewise, many rectifier implementations can be used, including but not limited to single-switch resonant rectifiers (such as E, F, Phi), and other rectifiers, including E/F, current-doubler rectifiers and z-source rectifiers, among others.

Figure 2:
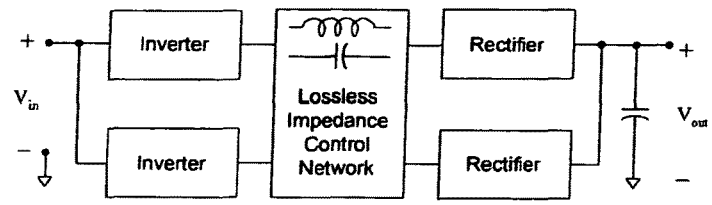
FIG. 2 is a block diagram of an impedance control resonant (ICR) high frequency dc/dc converter in which output power can be controlled by modifying the phase angle between the two inverters while maintaining low-loss switching through the use of an impedance control network. Also, owing to the operating characteristics, loss reduces with power, enabling high efficiency over a wide load range. ICR converters can also have more than two inverters and one or more rectifiers.

Referring now to FIG. 2, an impedance control resonant (ICR) dc/dc high frequency converter includes a pair of inverters each of which has an input and coupled to the converter input and each of which has an output. The ICR dc/dc converter further includes a pair of rectifiers each of which has an input and each of which has an output coupled to the converter output. An impedance control network has a plurality of inputs each coupled to a corresponding output of the inverters and a plurality of outputs each coupled to a corresponding input of the plurality of rectifiers. The impedance control network responds to the modification of a phase angle between each of the inverters such that the effective impedances at the inputs of the impedance control network are highly resistive at the fundamental frequency. Thus, output power of the converter can be controlled by modifying the phase angle between the two inverters while maintaining low-loss switching through the use of the impedance control network. Also, owing to the operating characteristics, loss reduces with power, enabling high efficiency over a wide load range. It should be appreciated and as will be described further below, ICR converters can also have more than two inverters and one or more rectifiers.

It should, of course, be appreciated that the ICR converter can also be designed as an inverter (dc/ac converter) for synthesizing an ac output component at frequencies far below the switching frequency. The architecture for an ICR inverter would be similar to the one shown in FIG. 2 except it would incorporate an unfolding bridge at its output. Another feature of this architecture is that it can allow bi-directional power flow with appropriate inverter/rectifier stages, such as half-bridges.

It should, of course, be appreciated that the ICR converter can also be designed as a rectifier (ac/dc converter) for converting an ac input at frequencies far below the switching frequency (e.g., line frequency—60 Hz, 50 Hz etc.) into a dc output. The architecture for an ICR rectifier would be similar to the one shown in FIG. 2 except it would incorporate a rectifier at its input. This architecture can also allow bi-directional power flow with appropriate inverter/rectifier stages.

The architecture of an impedance control resonant (ICR) high frequency dc/dc converter shown in FIG. 2 incorporates lossless networks that draw upon the concepts of lossless power combiners and resistance compression networks. The impedance control network responds to differential phase shift in the operation of two or more inverters, effectively having the effective input impedances of the impedance control networks look highly resistive at the fundamental frequency and enabling switching of the inverters at low loading current. The effective input resistance varies with phase shift, enabling power control. This technique enables zero current switching of the inverters. By incorporating or modifying the networks for slight inductive loading of the inverters, one can realize slightly inductive impedance and hence allow zero voltage and near zero current switching. The impedance control network may incorporate a resonant tank, may also incorporate an isolation transformer and may also incorporate transmission lines, matching networks and/or non-reciprocal components (such as circulators).

In one embodiment, the converter is operated at a fixed (or narrow range) switching frequency and each inverter is operated at a fixed duty ratio within the range of about 35% to about 65% with a range of about 40% to about 60% being common and in some cases a fixed duty ratio of approximately 50% being preferred. The two inverters are operated with a phase shift between them. Output power is controlled by controlling this phase shift. By using an appropriate impedance control network the susceptance seen by the two inverters can be made constant as a function of output power, negative (i.e., inductive) and arbitrarily small for the designed input and output voltages. Hence, the input admittance seen by the inverters can be made purely conductive across the full output power range at the designed input voltage; and predominantly conductive even with a reasonably wide variation in input voltage.

In an alternative embodiment with an appropriate impedance control network, there is a particular phase shift (or set of phase shifts) as a function of input voltage and output voltage for which the susceptances seen by the inverters will be zero (or some other desired value). By controlling the inverters to operate at such a particular phase shift, desirable operation of the inverters may be obtained. Power is a function of this phase shift, and delivered power may be further controlled by on-off control of the inverters (at a frequency lower than the switching frequency).

One importance aspect of an appropriate impedance control network is an asymmetric power combining means that effectively combines power from multiple inverters, while realizing desirable loading for the inverters. To understand the importance of asymmetric combining, it is useful to appreciate that many prior-art dc-dc converters incorporating multiple inverters or inverter structures, such as that of FIG. 1A, directly combine power from the inverters. As a result, the voltage or current applied to the rectifier is a (possibly weighted) vector sum of the individual inverter voltages or currents.

Figure 2A:
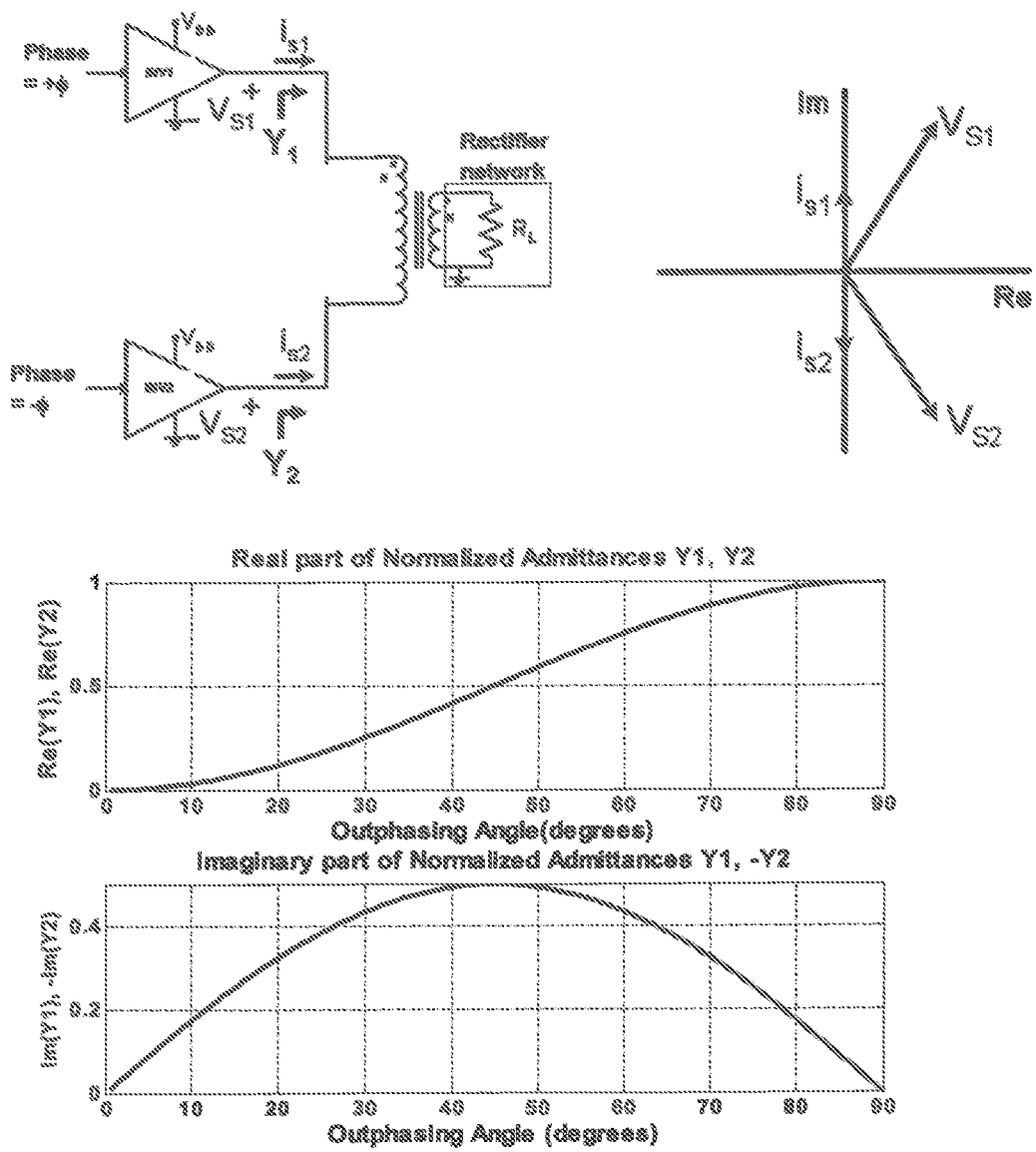
FIG. 2A is a model for inverter power combining in a conventional (prior art) phase shift (outphasing) dc-dc converter, with the rectifier system modeled as a resistor. Relevant inverter voltages and currents for the modeled system are also shown as are the normalized real (conductance) and imaginary (susceptance) components of the effective admittances seen by the inverters at the switching frequency.

FIG. 2A illustrates the inverter power combining present in the prior-art converter of FIG. 1A, for example, considering fundamental-frequency components and with the rectifier system modeled in a simplified fashion as a load resistor which may vary with operating condition. A phasor representation of the inverter fundamental voltages and resulting inverter fundamental currents are also shown. Under phase-shift (or outphasing) control, the switching of inverter 1 leads that of inverter 2 by an angle $2\phi$. Because the voltage applied at the rectifier is a vector sum of the inverter voltages, the current of the two inverters (as determined by the rectifier) are not in phase with their voltages. Moreover, the leading ($+\phi$) inverter has its fundamental current leading the voltage (capacitive loading) while the lagging ($-\phi$) inverter has its current lagging the voltage (inductive loading), also as illustrated in FIG. 2A. This leads to undesirable switching operation of the inverters.

Impedance control networks provide power combining of the inverters in a manner that enables the currents developed by the inverters to be in-phase or nearly in-phase with the individual inverter voltages. This is done by appropriate selection of reactance values within the impedance control network to provide phases of the inverter currents to be more closely (or exactly) in phase with the inverter voltages. The inverters interact via the impedance control network such that the switching frequency components of the individual inverter currents remain close to in phase with the corresponding individual inverter switching frequency voltage components as the relative inverter phase angles change. The impedance control network causes the inverters to interact such that the switching frequency components of the individual inverter currents remain relatively close in phase to the corresponding individual inverter switching frequency voltages as the relative inverter phase angles change over a specified operating range, such that the inverter switches commutate at currents that are low compared to their peak currents. Because leading and lagging inverter branches have different phase relationships with the combined voltage or current driving the rectifier network, the reactances in the impedance control network are asymmetric with respect to the different ICN input ports. This asymmetry provides appropriate response for leading and lagging inverters. For example, FIG. 2B illustrates an exemplary circuit for one exemplary embodiment of inverter power combining in a dc-dc converter with an ICN, considering only characteristics at the fundamental switching frequency.

Figure 2B:
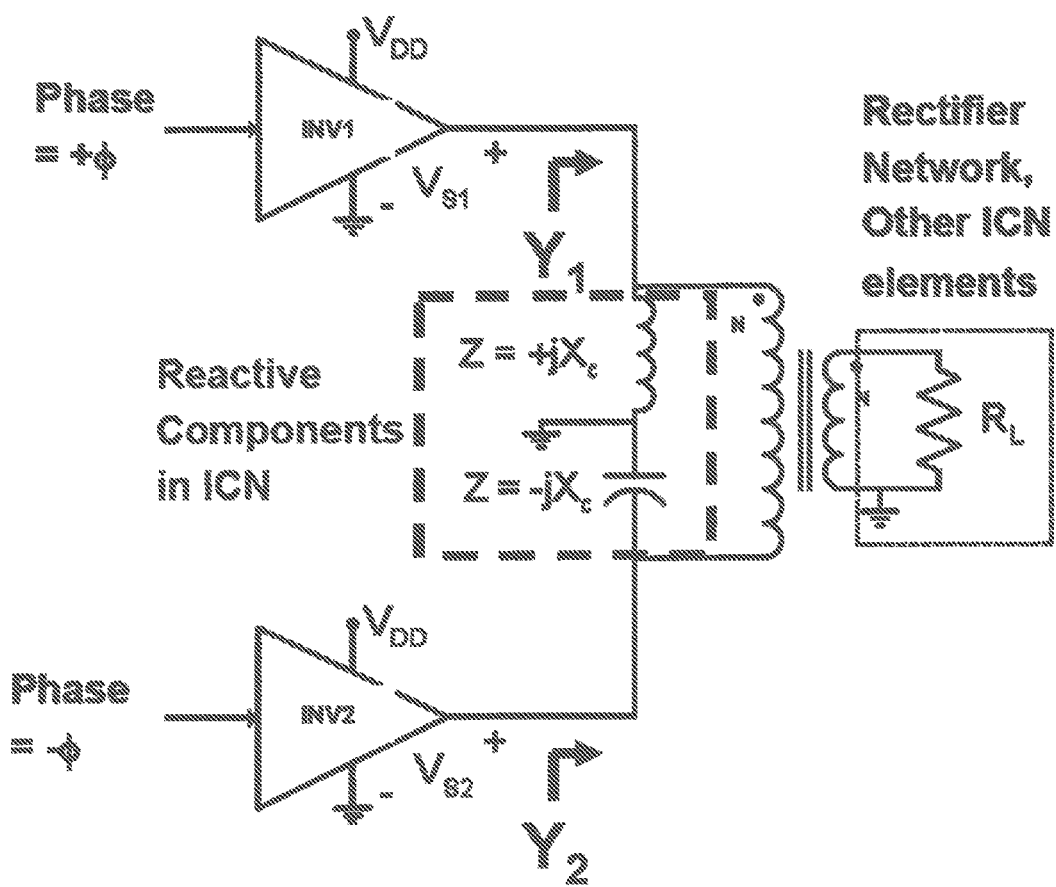
FIG. 2B is a model for inverter power combining in a dc-dc converter with an ICN, considering only fundamental switching frequency components. The rectifier system (and possibly including additional portions of the ICN) is modeled as a resistor whose value may vary with operating point. Some key reactive components in the ICN are illustrated. As compared to the conventional prior-art system of FIG. 2A, the reactances in the ICN operate to partly or wholly bring the individual inverter currents in phase with the individual inverter voltages. The reactances are asymmetric (not the same for each inverter) to properly compensate both the leading and lagging inverters.

The rectifier system (and possibly including additional portions of the ICN) is illustrated in FIG. 2B as a resistor having a value which may vary with operating point. (In some embodiments, the effective load may also become partly inductive or capacitive.) Some significant reactive components in the ICN are illustrated. As compared to the conventional prior-art system of FIG. 2A, the reactances in the ICN operate to partly or wholly bring the individual inverter currents in phase with the individual inverter voltages. The reactances are asymmetric (not the same for each inverter) to properly compensate both the leading and lagging inverters. Here, the leading inverter receives added capacitive susceptive compensation, while the lagging inverter receives inductive susceptive compensation.

It should be noted that additional reactive components in the ICN may interact with one or more rectifiers so as to provide additional desirable variation in the effective resistance RL in FIG. 2B (or more generally impedance with a resistive component), further enabling maintenance of desirable admittances loading the inverters (Y1, Y2) across operating conditions. This may be realized with single- or multi-level resistance compression networks coupled to multiple rectifiers as part of the ICN, for example. Moreover, note that while combining in the ICN is asymmetric, some ICN networks may provide for similar or identical admittance amplitudes loading the individual inverters, such that current and/or power delivery from different inverters are similar.

It should be noted that this asymmetric combining is applicable in ICN converter systems having more than two inverters.

Figure 2C:
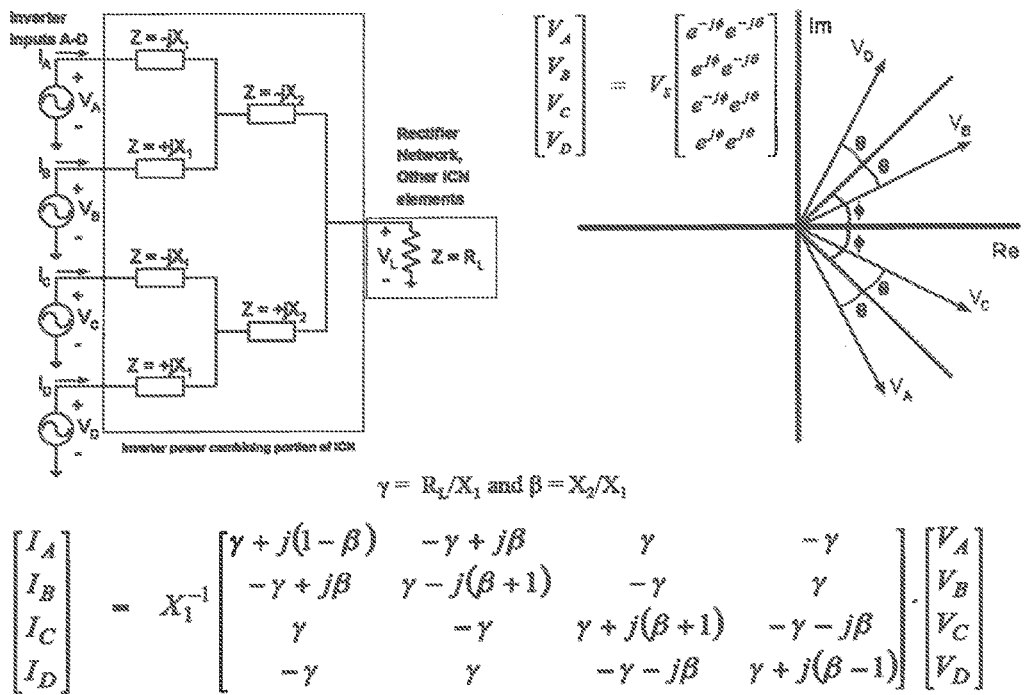
FIG. 2C is a model for inverter power combining in a dc-dc converter with an ICN having 4 inverters, considering only fundamental switching frequency components. Some key reactive components in the ICN for combining power from the individual inverters are illustrated. The rectifier system (and possibly including additional portions of the ICN) is modeled as a resistor whose value may vary with operating point. The phase relationships among the inverters is illustrated, as is the relationship of the inverter currents to the inverter voltages, combining reactances, and effective resistance imposed by the rectifier system. The reactances in the ICN operate to partly or wholly bring the individual inverter currents in phase with the individual inverter voltages. The reactances used in combining power from the inverters are asymmetric (not the same for each inverter) to properly compensate for the different phase relationships among inverters.

FIG. 2C, for example, shows a model for inverter power combining in a dc-dc converter with an ICN having 4 inverters, considering only fundamental switching frequency components. (The inverters are simply illustrated as voltage sources $V_A$-$V_D$ having appropriate relative phases.)

Some significant reactive components in the ICN for combining power from the individual inverters are illustrated. The rectifier system (and possibly including additional portions of the ICN) is modeled in the exemplary embodiment of FIG. 2C, as a resistor having a value which may vary with operating point. The phase relationships among the inverters is illustrated, as is the relationship of the inverter currents to the inverter voltages, combining reactances, and effective resistance imposed by the rectifier system. The reactances in the ICN operate to partly or wholly bring the individual inverter currents in phase with the individual inverter voltages. The reactances used in combining power from the inverters are asymmetric (not identical for each inverter) to properly compensate for the different phase relationships among inverters.

After reading the description provided herein, those of ordinary skill in the art will appreciate that there exists multiple specific embodiments which may employ the general concepts described herein. Several of such exemplary embodiments are described herein for the purpose of promoting clarity in the description of the broad concepts described and/or illustrated herein and not for the purpose of limiting the scope of the concepts.

Figure 3:
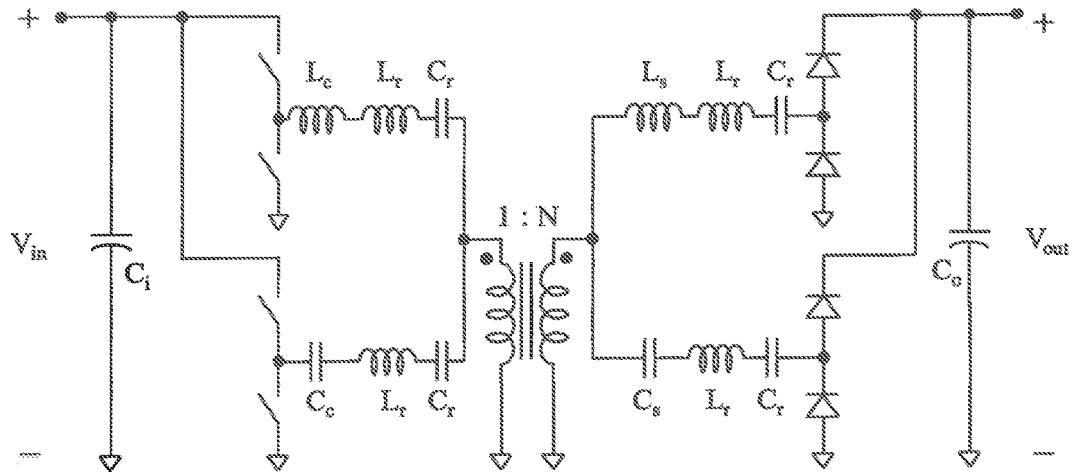
FIG. 3 is a series impedance control resonant (ICR) high frequency dc/dc converter with lossless series combiner and series resistance compression network and half-bridge inverters and rectifiers.

Referring now to FIG. 3, one exemplary embodiment of an impedance control resonant (ICR) high-frequency converter architecture is described. This exemplary embodiment, which is a Series-Series ICR dc/dc converter, uses a Chireix-like series combiner (complementary reactances, $j\omega L_c$ and $1/j\omega C_c$, in series with the inverter outputs) with a series resistance compression network. In FIG. 3, the two $L_r$ and $C_r$ pairs are the resonant tanks for the two inverters; $L_c$ and $C_c$ constitute the combiner network; and $L_s$ and $C_s$ form the resistance compression network; and $C_i$ and $C_o$ are input and output filtering capacitances, respectively. The two controllable half-bridges serve as the inverters and the diode half-bridges serve as the rectifiers. The inverter switches can be any controllable switch and the rectifier devices can be any non-controllable or controllable rectifying device. It should be noted that although diode rectifiers are shown in the exemplary embodiment of FIG. 3, synchronous rectification with controllable switches can also be employed. It should also be noted that although certain inductive elements are shown as two separate inductors in series (e.g., inductors $L_c$ and $L_r$), these series inductors can be combined into a single inductor or inductive element. Similarly two separate capacitive elements shown in series (e.g., capacitors $C_c$ and $C_r$) can also be combined into a single capacitor or capacitive element.

Figure 4:
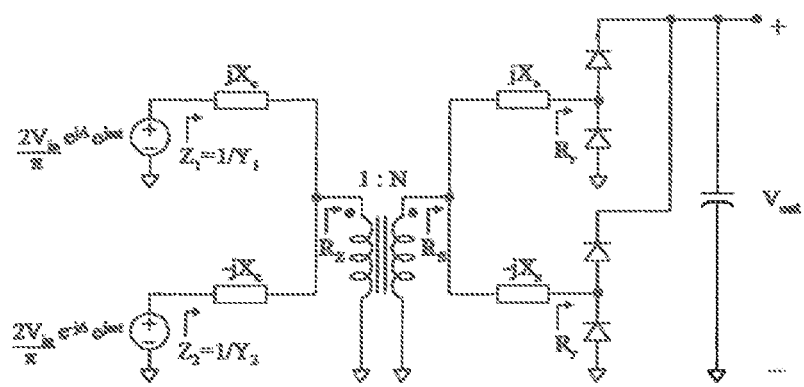
FIG. 4 is a fundamental frequency model of the ICR converter of FIG. 3 with operation assumed at the resonant frequency of the resonant tanks and $L_c$, $C_c$, $L_s$ and $C_s$ related through equations (1) and (2).

To understand how this converter achieves zero current switching (ZCS) across a wide operating range, consider the equivalent circuit model shown in FIG. 4, where higher order harmonics of the switching frequency have been neglected (a reasonable assumption for many designs). The inverters are modeled as sinusoidal voltage sources at the angular switching frequency $\omega$, with amplitude equal to that of the fundamental harmonic and with a relative phase difference of $2\Delta$. The resonant tanks act as short circuits at the switching frequency and are therefore ignored in the fundamental frequency model of FIG. 4 and in the analysis that follows. Finally in FIG. 4, it has been assumed that the values of $L_c$ and $C_c$ have been selected in such a way that the two combiner reactances have equal magnitude; similarly $L_s$ and $C_s$ are selected to make the magnitude of the two resistance compression reactances equal:

$$\omega L_c = \frac{1}{\omega C_c} \equiv X_c, \text{ and} \tag{1}$$

$$\omega L_s = \frac{1}{\omega C_s} \equiv X_s. \tag{2}$$

Using Fourier analysis it can be shown that the effective input impedance of the rectifiers at the fundamental harmonic of the switching frequency is given by:

$$R_r = \frac{4V_{out}^2}{\pi^2 P}, \tag{3}$$

where P is the output power delivered by the converter. Hence, the effective input impedance presented by the resistance compression network, $R_S$, at the secondary of the transformer is given by:

$$R_S = \frac{R_r}{2} + \frac{X_s^2}{2R_r} = \frac{2V_{out}^2}{\pi^2 P} + \frac{\pi^2 X_s^2 P}{8V_{out}^2}, \tag{4}$$

and this resistance seen from the primary side of the transformer is:

$$R_Z = \frac{R_S}{N^2} = \frac{2V_{out}^2}{\pi^2 N^2 P} + \frac{\pi^2 X_s^2 P}{8N^2 V_{out}^2}. \tag{5}$$

Similarly under the assumption that the operating frequency of the converter is at resonance and all the harmonics other than the fundamental can be neglected, the effective input admittances seen by the two inverters are given by:

$$Y_1 \equiv G_1 + jB_1 = \frac{R_Z}{X_c^2}(1 - \cos 2\Delta) + j\left(\frac{R_Z}{X_c^2}\sin 2\Delta - \frac{1}{X_c}\right), \text{ and} \tag{6}$$

$$Y_2 \equiv G_2 + jB_2 = \frac{R_Z}{X_c^2}(1 - \cos 2\Delta) + j\left(\frac{R_Z}{X_c^2}\sin 2\Delta - \frac{1}{X_c}\right), \tag{7}$$

where $2\Delta$ is the phase-shift between the two inverters. The term effective admittance refers to the ratio of complex current to complex voltage seen at the network input when both inverters (i.e., sources) are active. In equations (6) and (7), $G_1$ and $G_2$ are the conductances and $B_1$ and $B_2$ are the susceptances seen by the two inverters. Assuming that the converter is lossless, the output power, P, can be determined by setting it equal to the active power delivered by the inverters:

$$P = \frac{8V_{in}^2 R_Z}{\pi^2 X_c^2}\sin^2\Delta. \tag{8}$$

By combining equations (5) and (8), a closed form expression for $R_Z$ in terms of the circuit parameters, the input and output voltages and the phase shift can be determined:

$$R_Z = \frac{X_c^2 V_{out}^2}{2V_{in}\sin\Delta\sqrt{X_c^2 N^2 V_{out}^2 - X_s^2 V_{in}^2 \sin^2\Delta}}. \quad (9)$$

Using (6), (7) and (9) expressions for the input admittances (conductances and susceptances) seen by the two inverters of FIG. 3 can now be determined:

$$G_1 = G_2 = \frac{V_{out}^2 \sin\Delta}{V_{in}\sqrt{X_c^2 N^2 V_{out}^2 - X_s^2 V_{in}^2 \sin^2\Delta}}, \quad (10)$$

$$B_1 = -B_2 = \frac{V_{out}^2 \cos\Delta}{V_{in}\sqrt{X_c^2 N^2 V_{out}^2 - X_s^2 V_{in}^2 \sin^2\Delta}} - \frac{1}{X_c}. \quad (11)$$

Figure 5:
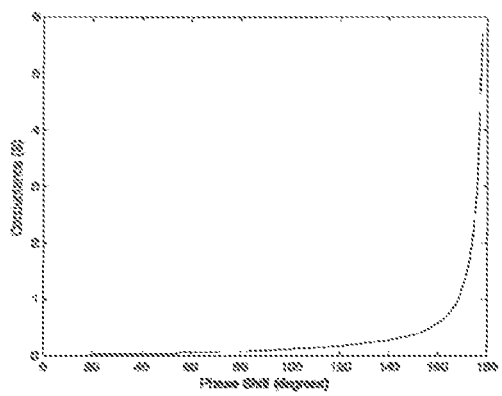
FIG. 5 is a plot of conductance, $G_1$ (=$G_2$), versus phase-shift, 2Δ, for the ICR dc/dc converter. The circuit parameters are: N=1, $X_c$=10Ω and $X_s$=10Ω. The input voltage, $V_{in}$, and output voltage, $V_{out}$, are 10V.

A plot of the conductance, $G_1$ (=$G_2$), versus phase-shift, $2\Delta$, is shown in FIG. 5 for an example series-series ICR dc/dc converter. It can be seen that by controlling phase shift between the two inverters one may adjust the real component of the effective load admittance and hence control power. As will be discussed below, control output power can additionally be controlled through or in combination with other means, such as on-off control (or burst control) of the inverters.

The conductances and susceptances may be expressed in terms of output power instead of the phase-shift angle:

$$G_1 = G_2 = \frac{\pi^2 P}{4V_{in}^2}, \text{ and} \quad (12)$$

$$B_1 = -B_2 = \frac{\sqrt{(X_s^2 V_{in}^2 - X_c^2 N^2 V_{out}^2)\pi^4 P^2 + 16V_{out}^4 V_{in}^2}}{4X_c V_{in}^2 N V_{out}} - \frac{1}{X_c}. \quad (13)$$

Plots of $G_1$ (=$G_2$), $B_1$ and $B_2$ versus output power for different values of input voltage are shown in FIGS. 6A-6D for an example series-series ICR dc/dc converter. Notice from FIG. 6A that the susceptance is zero for the full output power range when the input voltage equals the output voltage. The combiner and resistance compression network portions of the impedance control network interact in just such a fashion so as to maintain a purely resistive (conductive) loading of the two inverters over a wide power range. In general, for this highly desirable condition of purely conductive loading across output power as adjusted by phase shift alone, the input and output voltages should preferably be related as follows:

$$V_{in} = \frac{X_c}{X_s} N V_{out}. \quad (14)$$

This relationship between input and output voltage makes the susceptances $B_1$ and $B_2$ independent of output power; and equation (13) simplifies to:

$$B_1 = -B_2 = \frac{1}{X_c}\left(\frac{V_{out}}{NV_{in}} - 1\right). \quad (15)$$

To make the two susceptances ($B_1$ and $B_2$) zero irrespective of output power, the transformer turns-ratio must satisfy:

$$N = \frac{V_{out}}{V_{in}}. \quad (16)$$

Note that by combining (14) and (16), the relationship that $X_c$ and $X_s$ must satisfy, in order to make $B_1$ and $B_2$ zero, is:

$$\frac{X_c}{X_s} = \frac{V_{in}^2}{V_{out}^2}. \quad (17)$$

Together equations (16) and (17) are the necessary and sufficient requirements to make the susceptance seen by the two inverters zero irrespective of output power at a given input voltage $V_{in}$ and a given output voltage $V_{out}$. Under this condition, the admittance seen by the two inverters is purely conductive across the full output power range of the converter. Hence, each inverter's output current is in phase with the fundamental of its output voltage, ensuring that the current in the switches naturally goes to zero precisely at the time the switches are turning off, providing a zero current switching opportunity. Also, the current is naturally zero when the switches turn on and builds up gradually.

Also, since the admittance seen by the inverters is purely conductive and the conductance is directly proportional to the output power of the converter (see equation (12)) the current through the switches scales back in direct proportion to output power. Since conduction losses scale with current the converter losses reduce as output power is reduced, enabling high efficiency across the load range.

Note from FIGS. 6A-6D that while the inverters see zero susceptance when the conditions set forth in Equations (16) and (17) are satisfied, the susceptance deviates from zero as the conversion ratio changes. The deviation from zero susceptance with variation in conversion ratio can be minimized by appropriate selection of the circuit parameters, as will be discussed below. Considering still the behavior of the series-series ICR converter for the value of input voltage that satisfies equations (16) and (17) and hence makes the susceptances zero for the full output power range.

It is also possible to have zero voltage switching (ZVS) and near zero current switching (ZCS) in the ICR converter by incorporating an additional network in the converter. One method of doing this is described in conjunction with FIG. 7.

Figure 7:
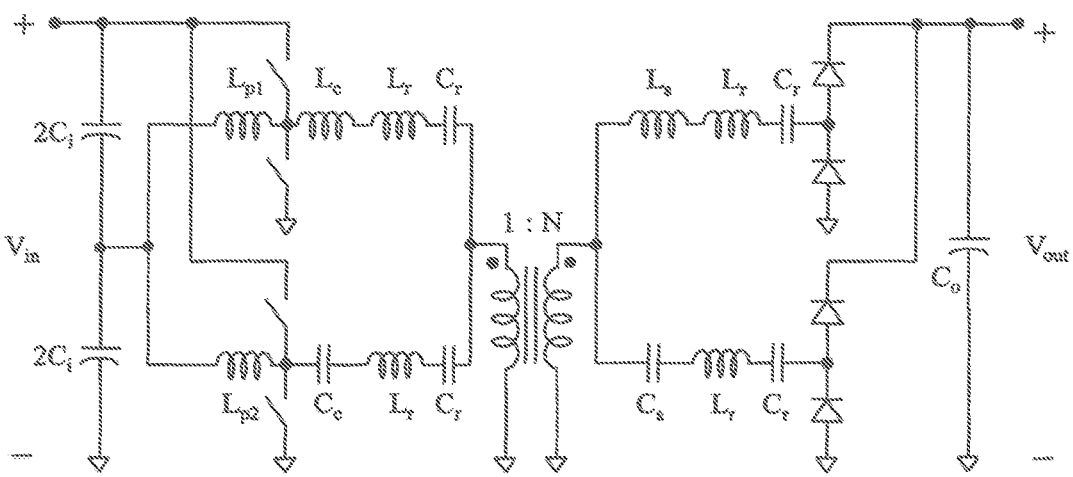
FIG. 7 is a series impedance control resonant (ICR) high frequency dc/dc converter with an additional input side network to enable zero voltage switching.
Figure 8A:
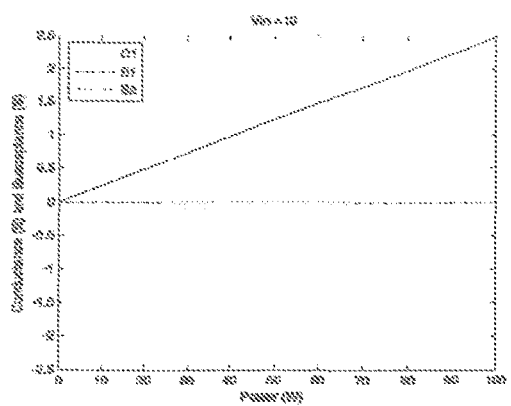
FIGS. 8A-8D are plots of $G_1$ (=$G_2$), $B_1$, and $B_2$ versus output power for four different values of input voltage: (a) $V_{in}$=150V, (b) $V_{in}$=175V, (c) $V_{in}$=200V, (d) $V_{in}$=300V. The circuit parameters are: N=1, $X_c$=1Ω and $X_s$=1Ω, and the output voltage ($V_{out}$) is kept constant at 10V. Output power is varied from 0 to 100 W.
Figure 8C:
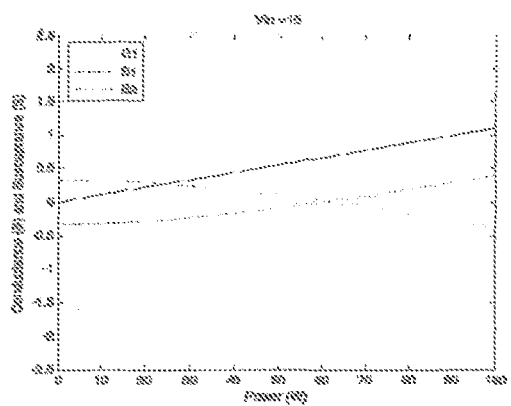
Figure 8B:
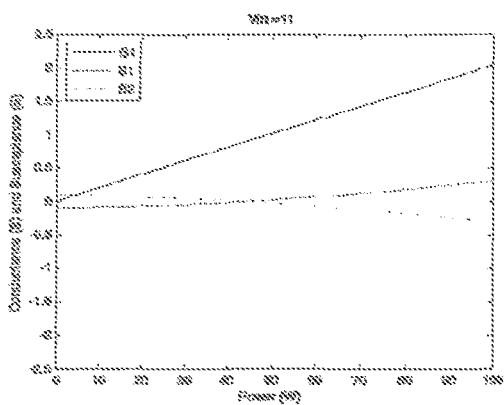
Figure 8D:
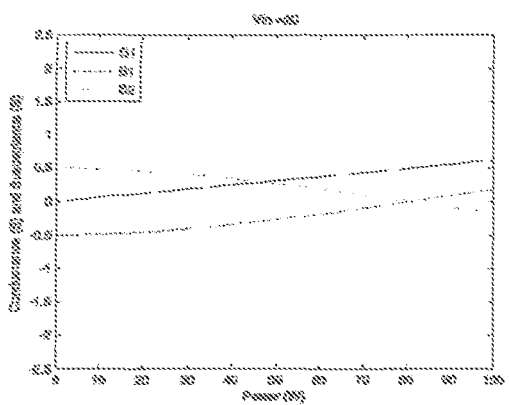
Figure 9A:
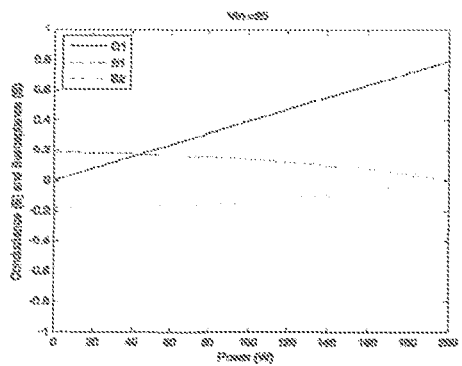
FIGS. 9A-9F illustrate conductance and susceptance seen by the two inverters over the converter's full output power range and at the following input voltages: (a) $V_{in}$=25V, (b) $V_{in}$=29V, (c) $V_{in}$=32.5V, (d) $V_{in}$=33V, (e) $V_{in}$=36V, and (f) $V_{in}$=40V. The converter was designed with the null in susceptance placed at its minimum input voltage (25V) and maximum output power (200W).
Figure 9D:
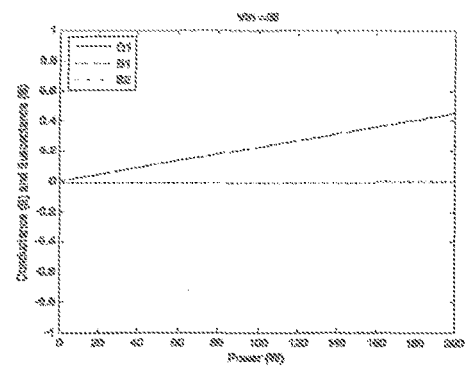
Figure 9B:
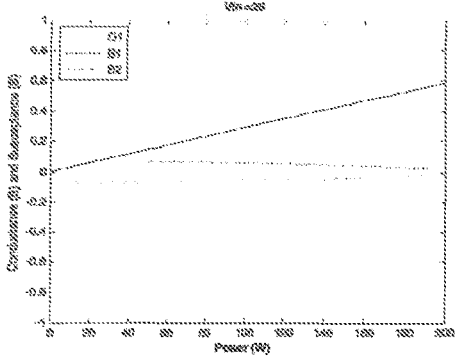
Figure 9E:
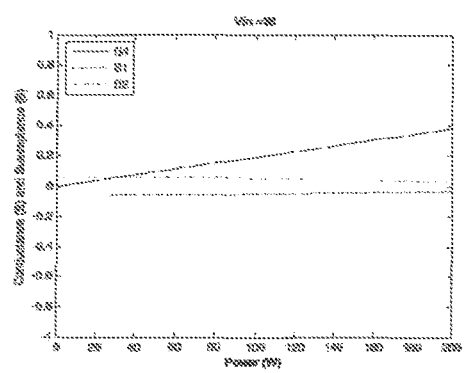
Figure 9C:
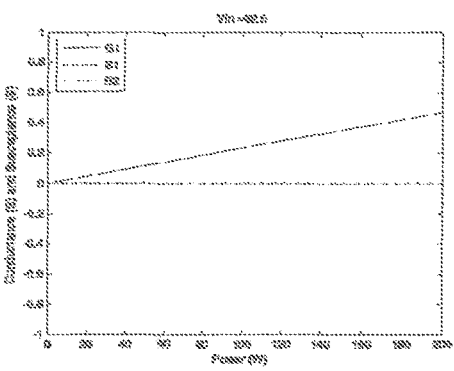
Figure 9F:
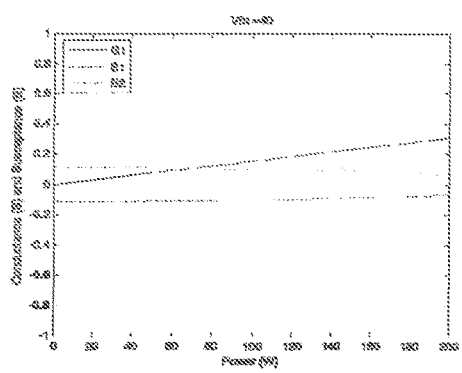
Figure 10A:
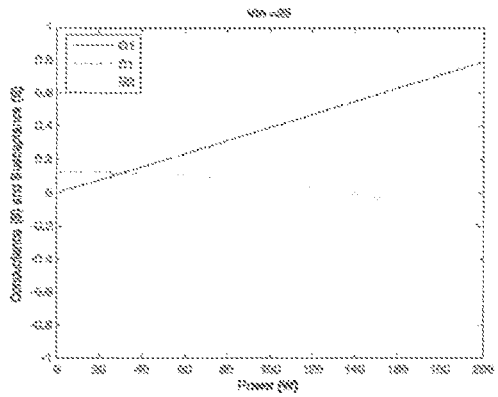
FIGS. 10A-10F illustrate conductance and susceptance seen by the two inverters over the converter's full output power range and at the following input voltages: (a) $V_{in}$=25V, (b) $V_{in}$=29V, (c) $V_{in}$=32.5V, (d) $V_{in}$=33V, (e) $V_{in}$=36V, and (f) $V_{in}$=40V. The converter was designed with the null in susceptance placed at 36V (close to maximum input voltage) and maximum output power (200W).
Figure 10D:
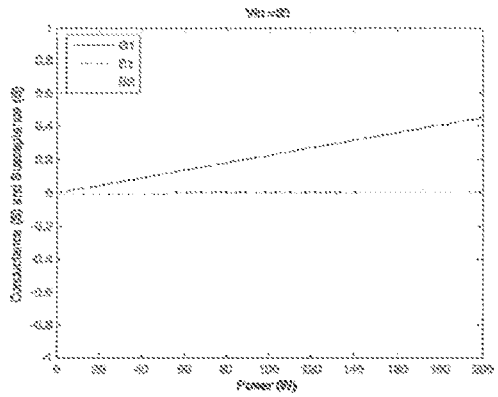
Figure 10B:
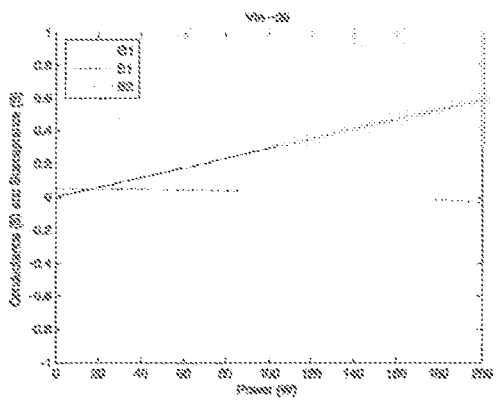
Figure 10E:
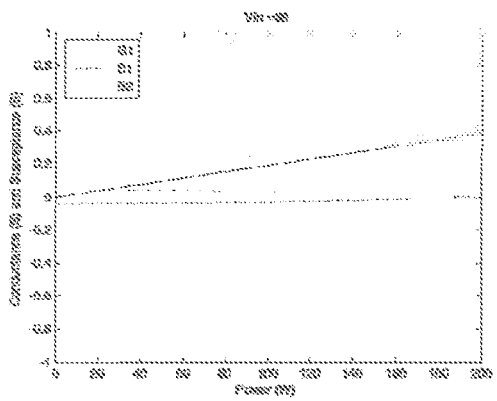
Figure 10C:
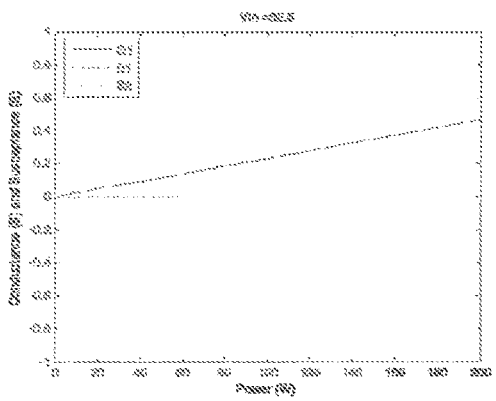
Figure 10F:
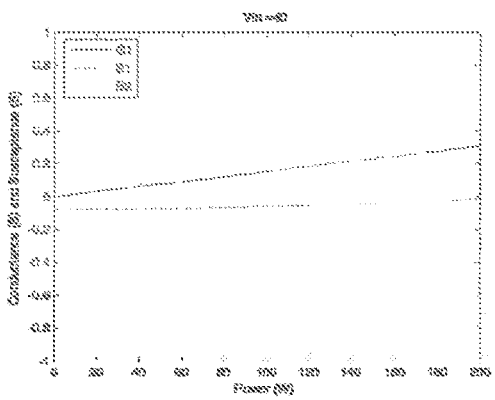

Referring now to FIG. 7, an additional network composed of inductive elements (illustrated as inductors $L_{p1}$ and $L_{p2}$ in the exemplary embodiment of FIG. 7) is incorporated into the ICR converter by splitting the input capacitance $C_i$. The Inductive elements (e.g. inductors $L_{p1}$ and $L_{p2}$) establish a small but finite inductive component of impedance for the two inverters. It should be noted that zero voltage switching requires the inverters to be slightly inductively loaded and that while such inductive loading is achieved in the exemplary embodiment of FIG. 7 through the use of additional inductors $L_{p1}$ and $L_{p2}$, in alternate embodiments this function can be absorbed into the impedance control network (ICN). It is straight forward to include the effect of $L_{p1}$ and $L_{p2}$ on the admittances seen by the two inverters. The admittance of $L_{p1}$ simply adds to $Y_1$; similarly the admittance of $L_{p2}$ adds to $Y_2$. Hence, the input admittance seen by the inverters in FIG. 7 is given by:

$$Y_{1t} \equiv G_{1t} + jB_{1t} = G_1 + jB_1 - \frac{j}{X_{p1}}, \text{ and} \quad (18)$$

-continued $$Y_{2t} \equiv G_{2t} + jB_{2t} = G_2 + jB_2 - \frac{j}{X_{p2}}, \quad (19)$$

where $X_{p1} = \omega L_{p1}$ and $X_{p2} = \omega L_{p2}$. Hence, the conductance and susceptance seen by the two inverters of FIG. 7 is given by:

$$G_{1t} = G_{2t} = \frac{\pi^2 P}{4 V_{in}^2}, \quad (20)$$

$$B_{1t} = \frac{\sqrt{(X_s^2 V_{in}^2 - X_c^2 N^2 V_{out}^2)\pi^4 P^2 + 16 V_{out}^4 V_{in}^2}}{4 X_c V_{in}^2 N V_{out}} - \frac{1}{X_c} - \frac{1}{X_{p1}}, \text{ and} \quad (21)$$

$$B_{2t} = \frac{-\sqrt{(X_s^2 V_{in}^2 - X_c^2 N^2 V_{out}^2)\pi^4 P^2 + 16 V_{out}^4 V_{in}^2}}{4 X_c V_{in}^2 N V_{out}} + \frac{1}{X_c} - \frac{1}{X_{p2}} \quad (22)$$

In the special case, where equations (16) and (17) are satisfied, the susceptances become:

$$B_{1t} = -\frac{1}{X_{p1}}, \text{ and} \quad (23)$$

$$B_{2t} = -\frac{1}{X_{p2}}. \quad (24)$$

Both susceptances, $B_{1t}$ and $B_{2t}$, are constant and negative, independent of output power. Equal values of $L_{p1}$ and $L_{p2}$ ($=L_p$) will make both susceptances equal. Also by choosing a large enough value for $X_p$ ($=\omega L_p$), $B_{1t}$ and $B_{2t}$ can be made arbitrarily small; hence both inverters see a predominantly conductive admittance across the full range of output power, yet have enough inductive loading to discharge the capacitance across each switch before it turns on, and hence provide a zero voltage turn-on opportunity. The capacitance across the switch enables zero voltage turn-off. With a small enough capacitance across the switch the necessary inductive loading can be minimized and the converter can also operate with near zero current switching. Hence, the ICR converter can achieve simultaneous zero voltage switching (ZVS) and near zero current switching (ZCS) across the full output power range at least at the nominal input voltage.

A design methodology is next explained.

Figure 6A:
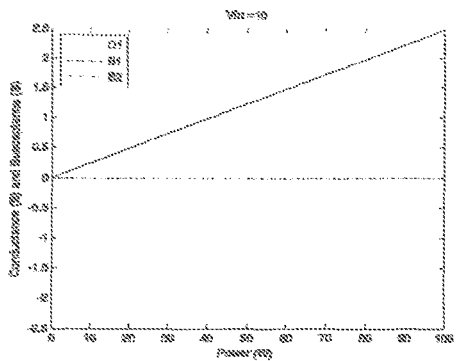
FIGS. 6A-6D are plots of $G_1$ (=$G_2$), $B_1$, and $B_2$ versus output power for four different values of input voltage: (a) $V_{in}$=10V, (b) $V_{in}$=11V, (c) $V_{in}$=15V, (d) $V_{in}$=20V. The circuit parameters are: N=1, $X_c$=10Ω and $X_s$=10Ω, and the output voltage ($V_{out}$) is kept constant at 10V. Output power is varied from 0 to 100W.
Figure 6B:
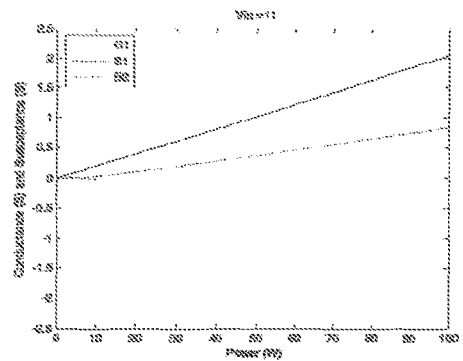
Figure 6C:
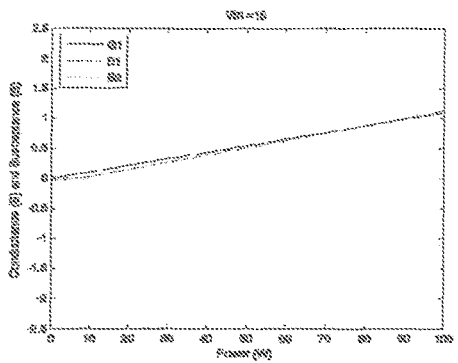
Figure 6D:
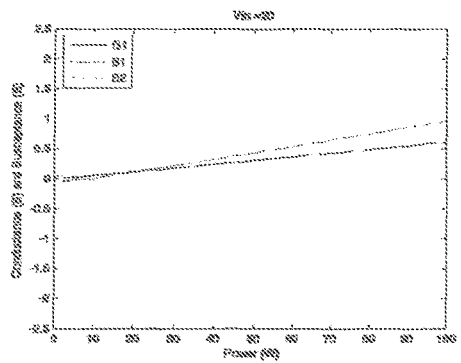

As described above, the series-series ICR converter has excellent performance (i.e., zero susceptance over the entire output power range) at a nominal input voltage value that satisfied equations (16) and (17) (see FIG. 6(A)). However, the susceptive loading component deviates significantly from zero even with a 10% change in input voltage. FIG. 8 shows the conductance and susceptance results for the same converter with the impedance control network reactances reduced by a factor of ten (i.e., $X_c = 1\Omega$ and $X_s = 1\Omega$) which still satisfies (16) and (17). With this change, the performance of the converter improves considerably at input voltages far from the nominal input voltage. Hence, there is a benefit to having a formal mechanism for selecting the best values of the circuit parameters (N, $X_c$ and $X_s$) for a given operating range.

One may begin by examining the range of input voltages that the converter can work over given a set of circuit parameters. The input-to-output voltage relationship for the series-series ICR converter, derived by equating its input power to its output power (i.e., assuming lossless conversion), is:

$$\frac{V_{out}}{V_{in}} = \sqrt{1 + \frac{16 R_L^2}{\pi^4 X_s^2} \frac{X_s}{X_c} \frac{1}{N} \sin\Delta}, \quad (25)$$

where $R_L$ is the effective load resistance with a value equal to:

$$R_L = \frac{V_{out}^2}{P}. \quad (26)$$

Equation (25) holds irrespective of whether the converter is being used to boost or reduce voltage. As the input voltage and output power (i.e., $R_L$) vary, the control circuit of the converter adjusts $\Delta$ to regulate output voltage to the desired value. From (25) it is clear that there is no theoretical upper limit on the input voltage that the converter can properly regulate, as $\Delta$ can be made small enough to get the desired output voltage. However, there is a lower limit to the input voltage that the converter can regulate as the maximum value of sin $\Delta$ is one.

The converter regulates for this minimum input voltage by operating at its highest possible conversion ratio—achieved when $\Delta = 90°$ (i.e., when the phase-shift between the two inverters, $2\Delta$, is 180°). In general, if $\Delta_{(max)}$ is the maximum employed value of $\Delta$ then the minimum value of input voltage that the converter can convert to the required output voltage is:

$$V_{in(min)} = \frac{V_{out}}{\sqrt{1 + \frac{16 R_L^2}{\pi^4 X_s^2}}} \frac{X_c}{X_s} \frac{N}{\sin\Delta_{(max)}}, \quad (27)$$

From equation (25) it is clear that it is most challenging for the converter to achieve a high output voltage when $R_L$ has its lowest value, i.e., when output power is at its maximum value of $P_{(max)}$. Therefore, the minimum input voltage that the converter can properly regulate from, over its entire output power range, is:

$$V_{in(min)} = \frac{V_{out}}{\sqrt{1 + \frac{16 V_{out}^4}{\pi^4 P_{(max)}^2 X_s^2}}} \frac{X_c}{X_s} \frac{N}{\sin\Delta_{(max)}}. \quad (28)$$

This equation can be rearranged as:

$$X_s = \frac{4 V_{out}^2}{\pi^2 P_{(max)}} \frac{1}{\sqrt{\frac{X_c^2}{X_s^2} \frac{V_{out}^2}{V_{in(min)}^2} \frac{N^2}{\sin\Delta_{(max)}} - 1}}. \quad (29)$$

It is desirable for the susceptance seen by the two inverters ($B_1$ and $B_2$) to be zero at the nominal input voltage, $V_{in(nom)}$. Hence, the circuit parameters which will ensure that equations (16) and (17) are satisfied at the nominal input voltage must satisfy:

$$\frac{X_c}{X_s} = \frac{V_{in(nom)}^2}{V_{out}^2}, \quad (30)$$

$$N = \frac{V_{out}}{V_{in(nom)}}. \quad (31)$$

Substituting (30) and (31) into (29) provides an expression for the largest allowable value of the reactance $X_s$, for a given minimum input voltage and maximum output power requirement:

$$X_{s(max)} = \frac{4V_{out}^2}{\pi^2 P_{(max)}} \frac{1}{\sqrt{\frac{V_{in(nom)}^2}{V_{in(min)}^2 \sin^2 \Delta_{(max)}} - 1}}. \quad (32)$$

Using Equations (30) and (32) it is possible to obtain an expression for the largest allowable value of the reactance $X_c$, for a given minimum input voltage and maximum output power requirement:

$$X_{c(max)} = \frac{4V_{in(nom)}^2}{\pi^2 P_{(max)}} \frac{1}{\sqrt{\frac{V_{in(nom)}^2}{V_{in(min)}^2 \sin^2 \Delta_{(max)}} - 1}}. \quad (33)$$

With knowledge of the upper bounds on the values of $X_s$ and $X_c$, it is to find their optimal values. One goal is to minimize the absolute value of the susceptances $B_1$ and $B_2$ over the entire input voltage and output power range.

Substituting the already established design rules given by equations (30) and (31) into equation (13) one can express the susceptances seen by the two inverters as follows:

$$B_1 = -B_2 = \frac{1}{X_s} \left( \frac{\sqrt{(V_{in}^2 - V_{in(nom)}^2)\pi^4 P^2 X_s^2 + 16 V_{out}^4 V_{in}^2}}{4 V_{in}^2 V_{in(nom)}} - \frac{V_{out}^2}{V_{in(nom)}^2} \right). \quad (34)$$

As expected, equation (34) goes to zero when input voltage equals the nominal input voltage, irrespective of output power. However, equations (34) also goes to zero when:

$$X_s = \frac{4V_{in}V_{out}^2}{\pi^2 V_{in(nom)} P}. \quad (35)$$

Hence by choosing $X_s$ appropriately, it is possible to make the susceptances also go to zero at input voltages other than the nominal input voltage at specific output power levels. By choosing the location of this null in susceptance it is possible to control the profile of the variation in susceptance with input voltage and output power. By visual inspection a desirable value for $X_s$ can be chosen.

TABLE 1

| Operating Specifications | |
|---|---|
| Output Voltage ($V_{out}$) | 400 V |
| Nominal Input Voltage ($V_{in(nom)}$) | 32.5 V |
| Minimum Input Voltage ($V_{in(min)}$) | 25 V |
| Maximum Input Voltage ($V_{in(max)}$) | 40 V |
| Minimum Output Power ($P_{(min)}$) | 20 W |
| Maximum Output Power ($P_{(max)}$) | 200 W |
| Maximum Phase-Shift ($2\Delta_{(max)}$) | 180° |
| Computed Parameters | |
| Largest Allowable Combiner Reactance ($X_{c(max)}$) | 2.58 Ω |
| Largest Allowable Splitter Reactance ($X_{s(max)}$) | 390.32 Ω |
| Selected Circuit Parameters | |
| Transformer turns ratio (N) | 12.31 |
| Combiner Reactance ($X_c$) | 2.48 Ω |
| Splitter Reactance ($X_s$) | 376.63 Ω |

To see this effect, consider the design of a series-series ICR converter with the operating specifications given in Table 1. Table 1 illustrates operating specifications and selected parameter values for an exemplary series-series combiner-splitter resonant (CSR) converter.

Referring now to FIGS. 9 and 10, the impact of the null's location can be seen. As can be seen from FIGS. 9 and 10, placing the null at maximum output power just shy of the maximum input voltage yields the best performance. The impedance control network reactances achieved this way are close in value to their maximum allowable values.

The circuit parameters, selected through this design process, for the example converter are also listed in Table 1. The resulting circuit has good performance across the full operating range.

Figure 11A:
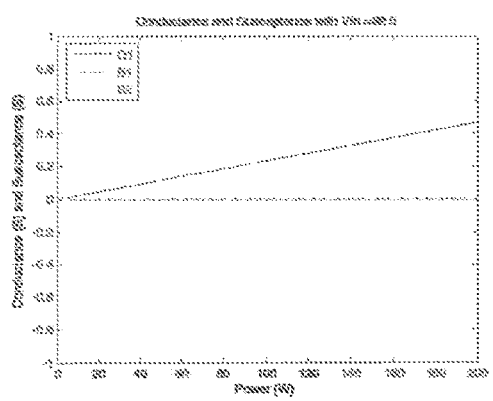
FIGS. 11A-11C illustrate conductance and susceptance seen by the two inverters over the full operating range of the converter: (a) nominal input voltage ($V_{in}$=32.5V), (b) minimum input voltage ($V_{in}$=25V), and (c) maximum output voltage ($V_{in}$=40V).
Figure 11B:
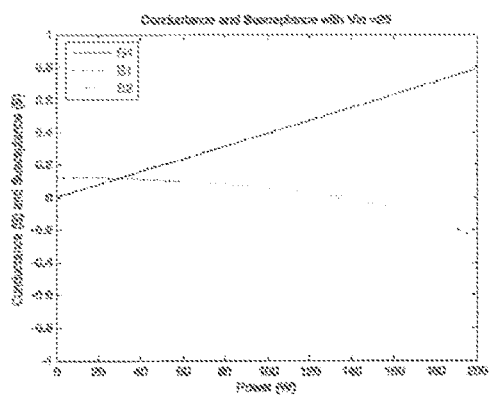
Figure 11C:
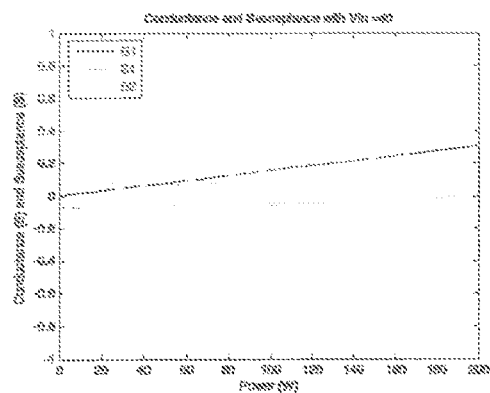

FIGS. 11A-11C shows the conductance and susceptance seen by the two inverters across the input voltage and output power range for the selected circuit parameter values. Ideal results are achieved (i.e., susceptance is zero) across the full output power range at the nominal input voltage of 32.5V. At the minimum and maximum values of input voltage, the magnitude of susceptance is less than that of conductance down to about 15% and 25% of full output power, respectively.

The output power of the ICR converter can also be controlled using a combination of phase-shift control and on/off (i.e., burst) control, or simply on/off control. For the series-series ICR described above, when the input voltage is equal to the designed nominal input voltage, the susceptance seen by the inverters is zero for all phase shifts between the two inverters. Hence, output power can simply be controlled by changing the phase shift between the inverters. However, when the input voltage is not equal to the designed nominal input voltage, the phase shift can be fixed at the value corresponding to output power given by:

$$P = \frac{4V_{in}V_{out}^2}{\pi^2 V_{in(nom)} X_s}. \quad (35A)$$

At this value of output power the susceptance seen by the inverters is also zero as can be seen from equation (35). Output power can then be further controlled to values below this value by turning the converter on and off at a frequency roughly an order of magnitude or more lower than the switching frequency of the converter.

The impedance control resonant (ICR) dc/dc converters described above are some of the many possible embodiments of the ICR converter. Next described are a number of additional exemplary embodiments of the ICR converter.

It is also possible to create ICR converters with two inverters and rectifiers using other impedance control networks. Three of these variants are described below.

Figure 12:
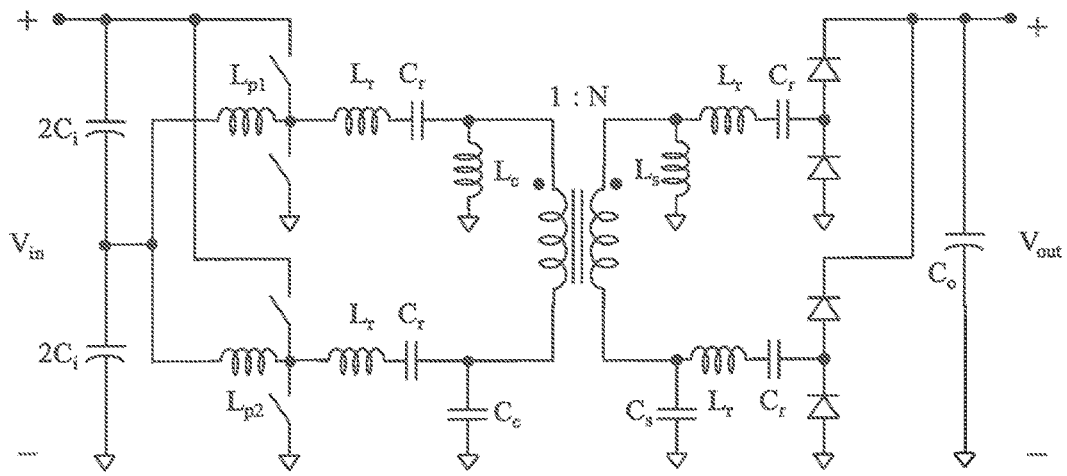
FIG. 12 is an isolated impedance control resonant (ICR) high frequency dc/dc converter with lossless parallel combiner and parallel resistance compression network and half-bridge inverters and rectifiers.

A second embodiment of the ICR converter uses a parallel Chireix-style combiner with a parallel resistance compression network, as shown in FIG. 12. The equations corresponding to equations (5), (6), (7) and (8) for the parallel-parallel ICR converter are:

$$R_Z = \frac{1}{N^2} \frac{2X_s^2 R_r}{R_r^2 + X_s^2} = \frac{\frac{8X_s^2 V_{out}^2}{\pi^2 N^2 P}}{\frac{16 V_{out}^4}{\pi^4 P^2} + X_s^2}, \quad (36)$$

$$Y_1 = Y_2^* = G_1 + jB_1 = G_2 - jB_2 = \frac{(1 - \cos 2\Delta)}{R_Z} + j\left(\frac{\sin 2\Delta}{R_Z} - \frac{1}{X_c}\right), \quad (37)$$

and $$P = \frac{8 V_{in}^2}{\pi^2 R_Z} \sin^2 \Delta, \quad (38)$$

Solving (36) and (38) gives:

$$R_Z = \frac{2 X_s V_{in} \sin \Delta}{N V_{out}^2} \sqrt{V_{out}^2 - N^2 V_{in}^2 \sin^2 \Delta} \quad (39)$$

Hence conductance and susceptance seen by the two inverters (without accounting for the effect of inductance values of inductive elements $L_{p1}$ and $L_{p2}$) is given by:

$$G_1 = G_2 = \frac{N V_{out}^2 \sin \Delta}{X_s V_{in} \sqrt{V_{out}^2 - N^2 V_{in}^2 \sin^2 \Delta}} \quad (40)$$

$$B_1 = -B_2 = \frac{N V_{out}^2 \cos \Delta}{X_s V_{in} \sqrt{V_{out}^2 - N^2 V_{in}^2 \sin^2 \Delta}} - \frac{1}{X_c} \quad (41)$$

The effect of inductance values from inductive elements $L_{p1}$ and $L_{p2}$ can be incorporated as described above:

$$G_{1t} = G_{2t} = G_1 = G_2 = \frac{N V_{out}^2 \sin \Delta}{X_s V_{in} \sqrt{V_{out}^2 - N^2 V_{in}^2 \sin^2 \Delta}} \quad (42)$$

$$B_{1t} = B_1 - \frac{1}{X_{p1}} = \frac{N V_{out}^2 \cos \Delta}{X_s V_{in} \sqrt{V_{out}^2 - N^2 V_{in}^2 \sin^2 \Delta}} - \frac{1}{X_c} - \frac{1}{X_{p1}} \quad (43)$$

$$B_{1t} = B_2 - \frac{1}{X_{p2}} = \frac{-N V_{out}^2 \cos \Delta}{X_s V_{in} \sqrt{V_{out}^2 - N^2 V_{in}^2 \sin^2 \Delta}} + \frac{1}{X_c} - \frac{1}{X_{p2}} \quad (44)$$

Figure 13:
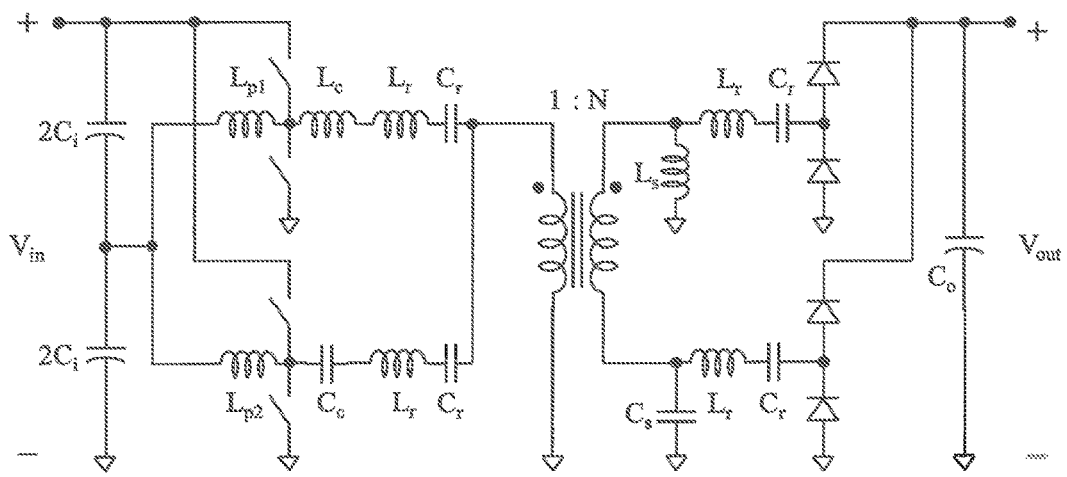
FIG. 13 is an isolated impedance control resonant (ICR) high frequency dc/dc converter with lossless series combiner and parallel resistance compression network and half-bridge inverters and rectifiers.

Another embodiment of the ICR converter can be created by using a series combiner with a parallel resistance compression network as shown in FIG. 13. The conductance and susceptance seen by the two inverters in this case (without accounting for the effect of $L_{p1}$ and $L_{p2}$) is given in Table 2.

Figure 14:
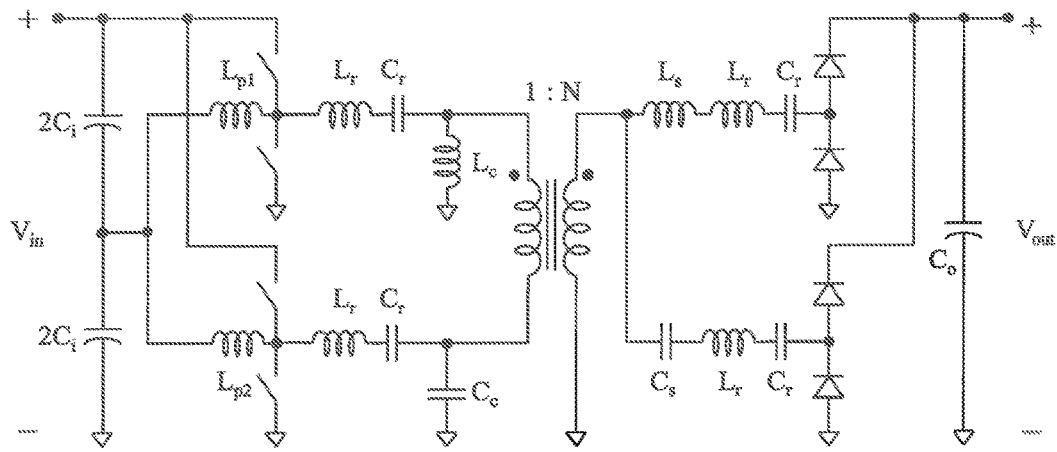
FIG. 14 is an isolated impedance control resonant (ICR) high frequency dc/dc converter with lossless parallel combiner and series resistance compression network and half-bridge inverters and rectifiers.

An ICR converter can also be created by using a parallel combiner with a series resistance compression network as shown in FIG. 14. The conductance and susceptance seen by the two inverters in this case (without accounting for the effect of $L_{p1}$ and $L_{p2}$) is given in Table 2.

The expressions for the admittance (conductance and susceptance) seen by the two inverters (without accounting for the effect of $L_{p1}$ and $L_{p2}$) for the four variants of the CSR converter discussed so far are summarized in Table 2. Notice that in all four cases the susceptance and conductance are related in the following manner:

$$B_1 = -B_2 = G_1 \cot \Delta - \frac{1}{X_c} \quad (45)$$

Figure 15:
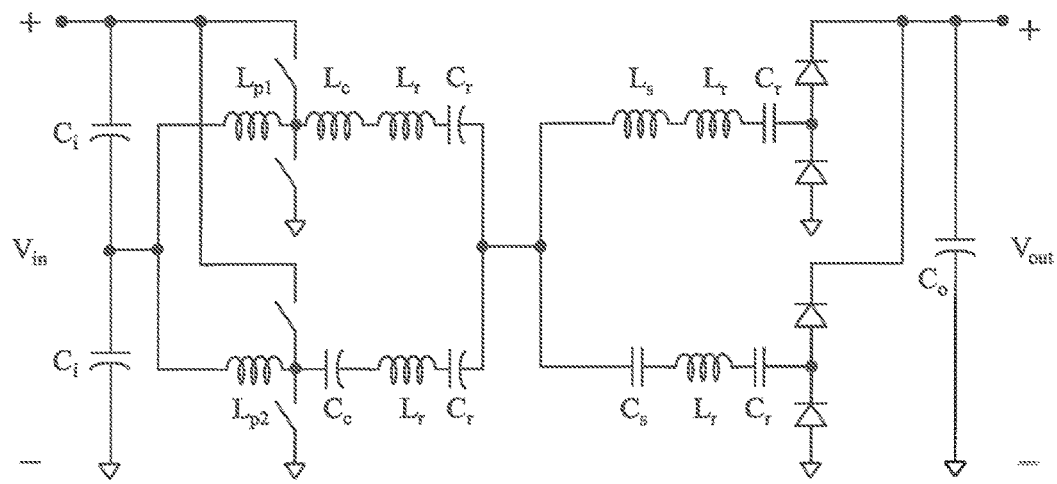
FIG. 15 is a non-isolated version of the series-series impedance control resonant (ICR) high-frequency dc/dc converter. Non-isolated versions of the other ICR converters presented here can similarly be created by removing the transformer.

It is also possible to create non-isolated versions of the ICR converters by removing the transformer from the impedance control network as shown for the series-series ICR case in FIG. 15.

The expressions for the conductance and susceptance seen by the two inverters in these cases can easily be derived by setting N=1 in the equations of Table 2.

TABLE 2

Admittance (conductance, $G_1$ & $G_2$, and susceptance, $B_1$ & $B_2$) seen by the two inverters of the four variants of isolated ICR dc/dc converters.

| | $G_1 = G_2$ | $B_1 = -B_2$ |
|---|---|---|
| Series Combiner-Series Splitter | $\dfrac{V_{out}^2 \sin \Delta}{V_{in} \sqrt{X_c^2 N^2 V_{out}^2 - X_s^2 V_{in}^2 \sin^2 \Delta}}$ | $\dfrac{V_{out}^2 \cos \Delta}{V_{in} \sqrt{X_c^2 N^2 V_{out}^2 - X_s^2 V_{in}^2 \sin^2 \Delta}} - \dfrac{1}{X_c}$ |
| Parallel Combiner-Parallel Splitter | $\dfrac{N V_{out}^2 \sin \Delta}{X_s V_{in} \sqrt{V_{out}^2 - N^2 V_{in}^2 \sin^2 \Delta}}$ | $\dfrac{N V_{out}^2 \cos \Delta}{X_s V_{in} \sqrt{V_{out}^2 - N^2 V_{in}^2 \sin^2 \Delta}} - \dfrac{1}{X_c}$ |
| Series Combiner-Parallel Splitter | $\dfrac{V_{out} \sqrt{4 X_s^2 V_{in}^2 \sin^2 \Delta - X_c^2 N^2 V_{out}^2}}{N X_c X_s V_{in}^2}$ | $\dfrac{V_{out} \cot \Delta \sqrt{4 X_s^2 V_{in}^2 \sin^2 \Delta - X_c^2 N^2 V_{out}^2}}{N X_c X_s V_{in}^2} - \dfrac{1}{X_c}$ |

TABLE 2-continued

Admittance (conductance, $G_1$ & $G_2$, and susceptance, $B_1$ & $B_2$) seen by the two inverters of the four variants of isolated ICR dc/dc converters.

| | $G_1 = G_2$ | $B_1 = -B_2$ |
|---|---|---|
| Parallel Combiner-Series Splitter | $\dfrac{V_{out}\sqrt{4N^2V_{in}^2\sin^2\Delta - V_{out}^2}}{X_s V_{in}^2}$ | $\dfrac{V_{out}\cot\Delta\sqrt{4N^2V_{in}^2\sin^2\Delta - V_{out}^2}}{X_s V_{in}^2} - \dfrac{1}{X_c}$ |

Figure 16:
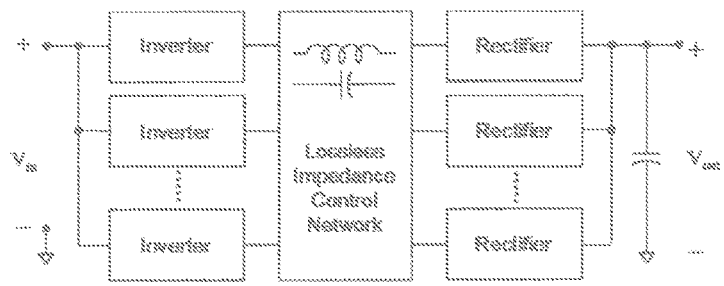
FIG. 16 is an impedance control resonant (ICR) dc/dc converter with more than two inverters and/or rectifiers.

The ICR converters considered have used two inverters and two rectifiers. It has, however, been recognized that it is also possible to create a large number of embodiments of the ICR converter that use more than two inverters and/or rectifiers, as shown in FIG. 16. These could use new combiner versions for power combination of multiple inverters, such as lossless multi-way power combining and could use multi-level resistance compression networks.

Figure 17:
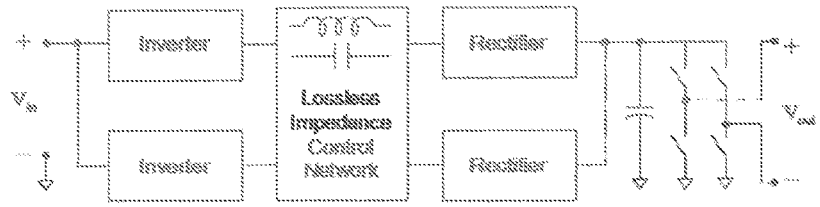
FIG. 17 is an impedance control resonant (ICR) inverter using an unfolding bridge at the output.

So far only impedance control resonant (ICR) dc/dc converters have been considered. All the embodiments of the ICR converter discussed above can be converted into an inverter (dc/ac converter) by either incorporating an unfolding bridge at the output, as shown in FIG. 17, or by actively controlling the switches in the rectifier stage in such a way so as to also provide a lower frequency inversion function.

Figure 18:
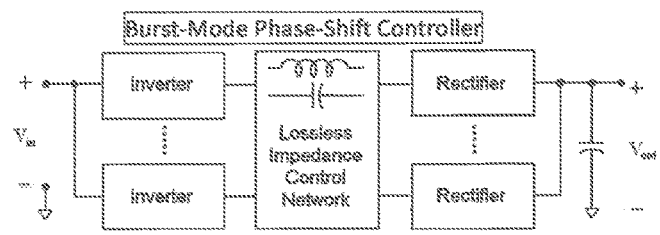
FIGS. 18 and 18A illustrate an architecture of an impedance control resonant (ICR) dc/dc converter with Burst-Mode Phase-Shift (BuMPS) control. The converter employs two or more inverters and one or more rectifier. The phase angle between the two inverters can be controlled to achieve low-loss switching across wide input and output voltage ranges because of the impedance control network. Output power can be controlled by turning the converter on and off at a frequency much lower than the switching frequency. Also, owing to the operating characteristics, loss reduces with power, enabling high efficiency over a wide load range. Note that while a parallel connection of inverter inputs is shown, a series connection may also be employed, and can be advantageous for high-input-voltage designs.
Figure 18A:
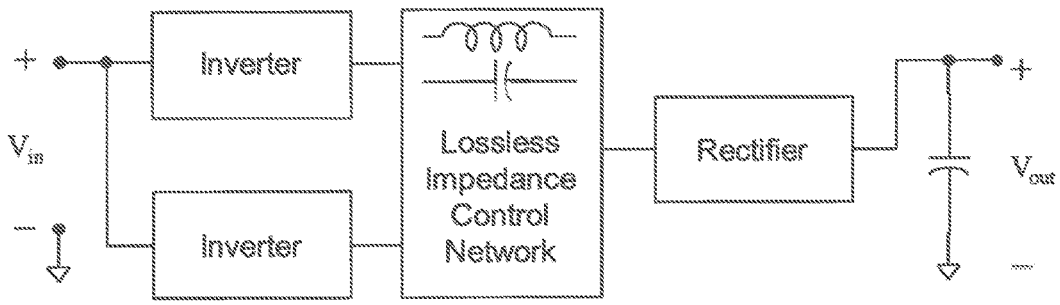

Referring now to FIG. 18, an architecture of an impedance control resonant (ICR) high frequency dc/dc converter is shown. As described below, the converter is operated with a Burst-Mode Phase-Shift (or "BuMPS") control in order to achieve high performance. Although a plurality of inverters and rectifiers is shown in FIG. 18, note that an ICR converter can be made with as few as two inverters and one rectifier as shown in FIG. 18A.

The architecture in FIG. 18 incorporates asymmetric combining networks—i.e. lossless networks that draw upon the concepts of lossless power combiners and resistance compression networks and exemplary illustrated in FIG. 18 as an impedance control network. This network introduces differential phase shift in the operation of two or more inverters, essentially having the effective impedances seen at the inputs of the impedance control network look highly resistive at the fundamental frequency and enabling switching of the inverters at low loading current. This technique enables zero current switching of the inverters. By modifying the networks for slight inductive loading of the inverters, one can realize zero voltage and near zero current switching.

It should be appreciated that the ICR converter can also be designed as an inverter (dc/ac converter) for synthesizing an ac output component at frequencies far below the switching frequency. The architecture for an ICR inverter would be similar to the one shown in FIG. 18 except it would incorporate an unfolding bridge at its output. Another feature of this architecture is that it can allow bi-directional power flow with appropriate inverter/rectifier stages, such as half-bridges.

It should be appreciated that the ICR converter can also be designed as a rectifier (ac/dc converter) for converting an ac input at frequencies far below the switching frequency (e.g., line frequency—60 Hz, 50 Hz etc.) into a dc output. The architecture for an ICR rectifier would be similar to the one shown in FIG. 18 except it would incorporate a rectifier at its input. This architecture can also allow bi-directional power flow with appropriate inverter/rectifier stages.

Figure 19:
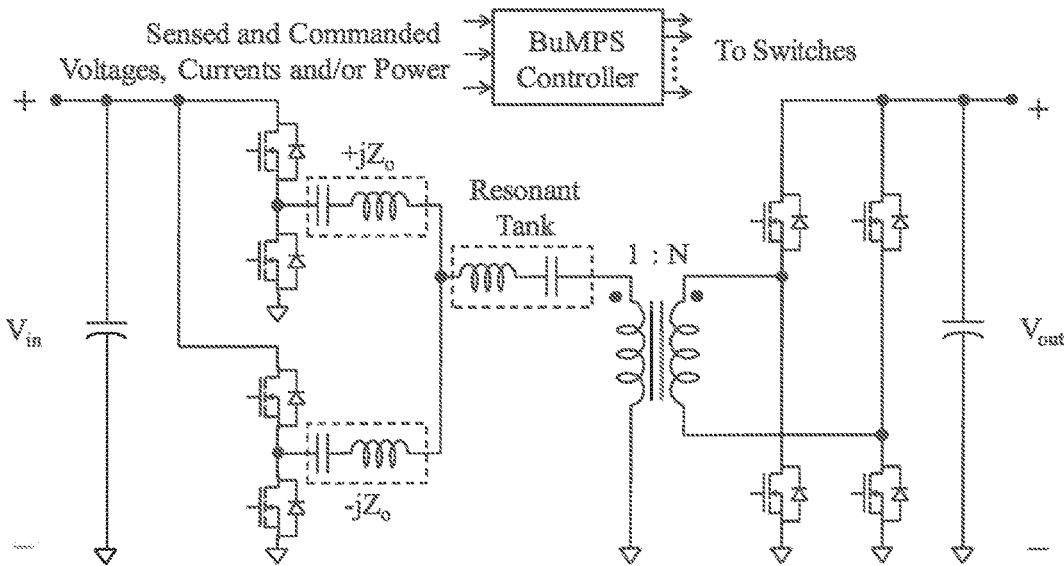
FIG. 19 is one exemplary implementation of an impedance control resonant (ICR) converter with BuMPS Control. Although synchronous rectifiers are shown, diode rectifiers can also be employed.

A specific implementation of the ICR converter with BuMPS control that is suitable for widely varying input voltages is shown in FIG. 19. This converter has a pair of half-bridge inverters, an impedance control network, and a single-full-bridge rectifier. (Clearly other inverter and rectifier topologies can be used.) The converter is operated at a fixed switching frequency and each inverter is operated at a fixed duty ratio (e.g., approximately 50%). (For other types of inverters, a different duty ratio might be selected.) When the switching frequency of the converter matches the resonant frequency of the resonant tank, and the two branches of the impedance control network are designed to have equal but opposite reactance, the admittances seen by the two inverters ($Y_1$ and $Y_2$) are given by:

$$Y_1 = Y_2^* = \frac{2V_{out}\sin\Delta}{NV_{in}Z_o} + j\left(\frac{2V_{out}\cos\Delta}{NV_{in}Z_o} - \frac{1}{Z_o}\right). \quad (46)$$

Figure 20:
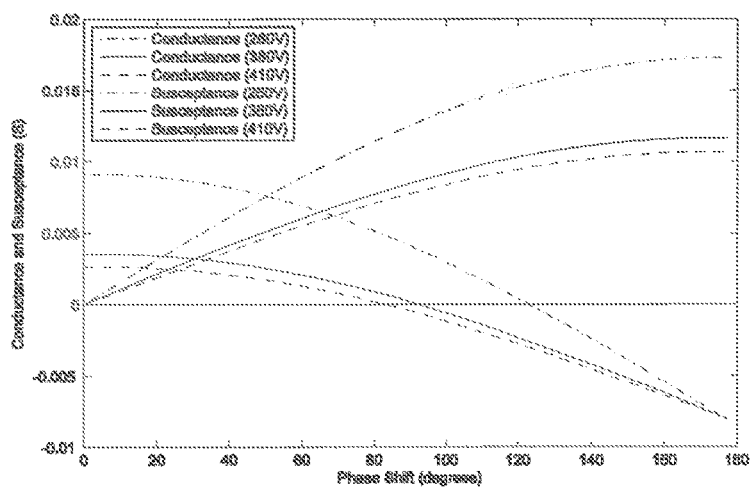
FIG. 20 is a plot showing conductance and susceptance seen by the two inverters as a function of their relative phase shift for three different input voltage values: 260V, 380V and 410V. Both inverters see the same conductance, but one sees the negative of the susceptance shown above.

Here $V_{in}$ is the input voltage, $V_{out}$ is the output voltage, N is the transformer turns ratio, $Z_o$ is the magnitude of the reactance of each of the two branches of the impedance control network, and $2\Delta$ is the phase shift between the two inverters. With this design, the effective susceptance seen by the two inverters can be made zero or arbitrarily small when the two inverters are operated with a specific phase shift between them, as shown in FIG. 20. The phase shift at which the susceptance seen by the inverters becomes zero is a function of the input-output voltage ratio and given by:

$$2\Delta = 2\cos^{-1}\left(\frac{NV_{in}}{2V_{out}}\right). \quad (47)$$

Hence, by varying this phase shift as the input voltage (and/or output voltage) varies, the admittance seen by the inverters can be kept purely conductive across the full input voltage (and output voltage) operating range of the dc-dc converter. This allows the inverter switches to have simultaneous zero-voltage-switching and near zero-current-switching capability (or simply pure zero-current switching), thus minimizing switching losses and boosting converter efficiency.

Figure 21:
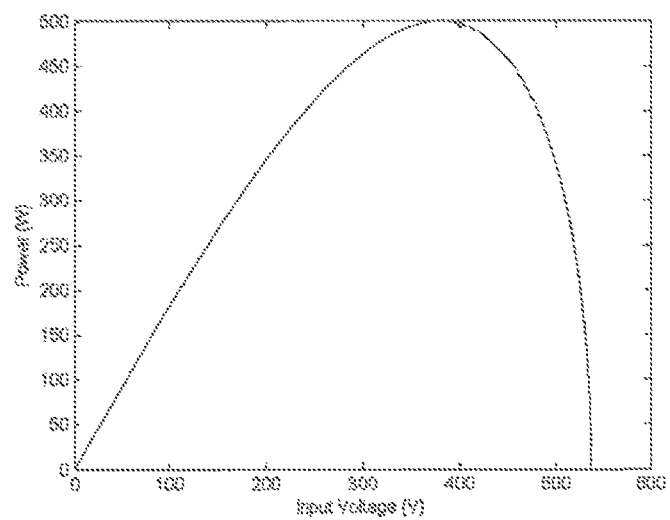
FIG. 21 is a plot of power vs. input voltage which illustrates a variation in output power as a function of input voltage for the ICR converter operated with the phase-shift between the two inverters controlled to provide zero susceptance as seen from the two inverters. In this example converter power varies only minimally over a voltage range centered at 380 V. This is in contrast to many other converter architectures, in which the open loop power transfer can vary linearly or as the square of input voltage.

When operated in the manner described above, good operation can be achieved over wide input voltage ranges. At a given switching frequency, the output power of an inverter is proportional to the square of the input voltage and the conductance seen by the inverter. In conventional designs, this can often lead to large variations in power delivery with input voltage that must be addressed (e.g., through oversizing of the inverter components and use of frequency control to modulate power). However, since the effective conductance seen by the inverters in our system decreases with increasing input voltage (see FIG. 20), the variation in output power with input voltage can be made quite limited across a wide input voltage range, as shown in FIG. 21, and expressed mathematically as:

$$P = \frac{4V_{in}\sqrt{4V_{out}^2 - N^2 V_{in}^2}}{\pi^2 N Z_o}. \quad (48)$$

This enables improved sizing of inverter components and use of fixed-frequency operation, with consequent benefits for efficiency. Output power of the converter can be further controlled (for values below that indicated in FIG. 21 and equation (48)) using a burst mode control strategy in which the operation of the converter is modulated on and off at a frequency much lower than its switching frequency. Burst control is desirable because converter losses back off proportionally to power delivered, thus enabling efficient operation to be maintained over a wide power range. Thus, with the proposed architecture described herein, it is possible to achieve wide voltage and power range operation at fixed switching frequency and high efficiency.

A design methodology for the ICR converter of FIG. 19 is next explained.

The output power of the ICR converter shown in FIG. 19 varies as a function on input voltage with a maximum at some input voltage. For best utilization the power maximum should occur within the design range for the input voltage. If this maximum is set at the nominal value of the input voltage $V_{in(nom)}$, and the nominal value of the output voltage, $V_{out(nom)}$, then the turns ratio of the transformer N can be determined from:

$$N = \frac{\sqrt{2} V_{out(nom)}}{V_{in(nom)}} \quad (49)$$

The actual value of the maximum output power is determined by the magnitude of the reactance of the two branches of the Impedance Control Network $Z_o$. Hence its value can be determined from the desired maximum power rating $P_{max}$ of the converter using:

$$Z_o = \frac{8 V_{out(nom)}^2}{\pi^2 N^2 P_{max}} \quad (50)$$

For example, for an ICR converter for a dc distribution application with $V_{in(nom)}$=380V, $V_{out(nom)}$=12V and $P_{max}$=500W, the designed value of N would be 0.0447 (corresponding to a roughly 22:1 turns ratio) and the designed value of $Z_o$ would be 116.8Ω.

The impedance control resonant (ICR) converters with BuMPS control described in the previous section are some of the many possible embodiments of the ICR converter. Described herein below for illustrative purposes only are a relatively small number or alternatives which are merely representative of the large number of possible additional embodiments of the ICR converter that can utilize BuMPS control.

Figure 22:
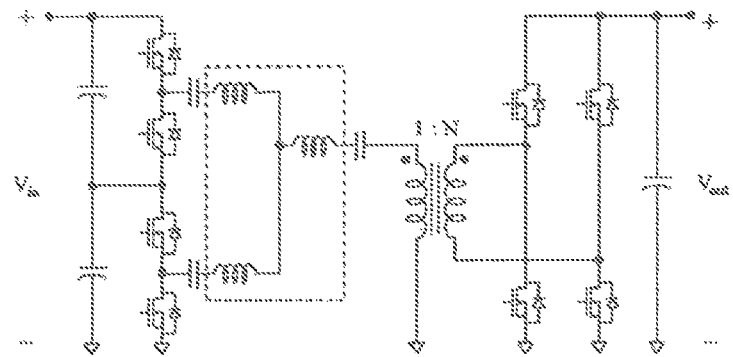
FIG. 22 is a schematic diagram of an alternate implementation of an impedance control resonant (ICR) converter with improved performance for high step-down applications. Note that the three inductors shown in the dotted box can be implemented as other types of inductive elements such as a single coupled-magnetic structure, reducing size and component count and improving efficiency.

It is also possible to create ICR converters by connecting the inverters in series (instead of in parallel) and splitting the input bus, as illustrated in FIG. 22. This seemingly modest change has a significant performance impact: Inverter device voltages are halved (important in high-voltage-input systems such as for dc-dc converters for dc distribution), and the required characteristic impedances of the resonant networks are reduced, benefiting implementation.

ICR Converter with Coupled Magnetics

Figure 23:
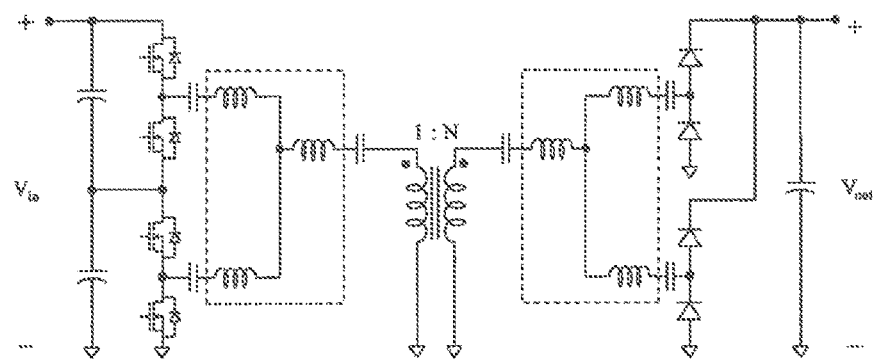
FIG. 23 is a schematic diagram of an impedance control resonant (ICR) converter with coupled-magnetics on both the inverter and the rectifier side.

It is also possible to create ICR converters in which the three resonant inductors used for the combiner network (shown inside the dashed box in FIG. 22 and FIG. 23) are realized as a single magnetic structure (instead of three separate elements), reducing each of passive component count, volume, and loss. It is also possible to create ICR converters which incorporate transformer parasitics (e.g., magnetizing and leakage inductance) to form a portion of the ICR network.

It is also possible to create non-isolated versions of the ICR converters by removing the transformer from the impedance control network.

It is also possible to create ICR converters using other impedance control networks. Some impedance control network designs could provide multiple resistive operating points, such that burst-mode control can be augmented with additional operating modes, providing a greater power range at high efficiency.

Figure 24:
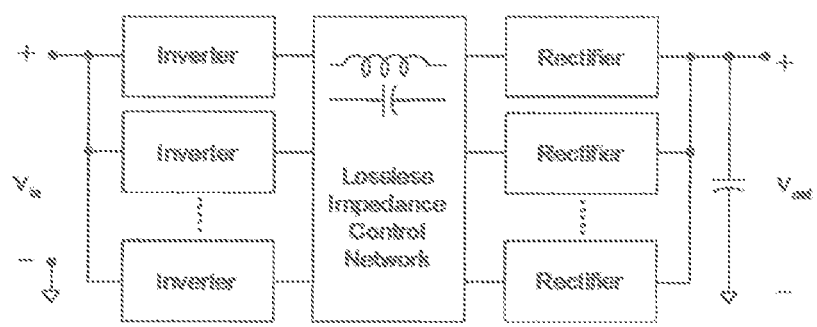
FIG. 24 is a block diagram of an impedance control resonant (ICR) dc/dc converter with more than two inverters and/or rectifiers.

Each of the described ICR converters which have been illustrated have used two separately-controlled inverters and one or two rectifiers. However, it is also possible to create a large number of embodiments of the ICR converter that use more inverters and/or rectifiers, as shown in FIG. 24. These could use new combiner versions for power combination of multiple inverters and could use multi-level resistance compression networks as part of the impedance control network, for example.

Figure 25:
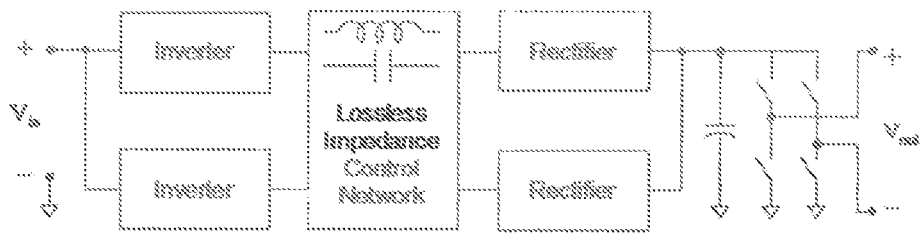
FIG. 25 is a block diagram of an ICR inverter using an unfolding bridge at the output
Figure 26:
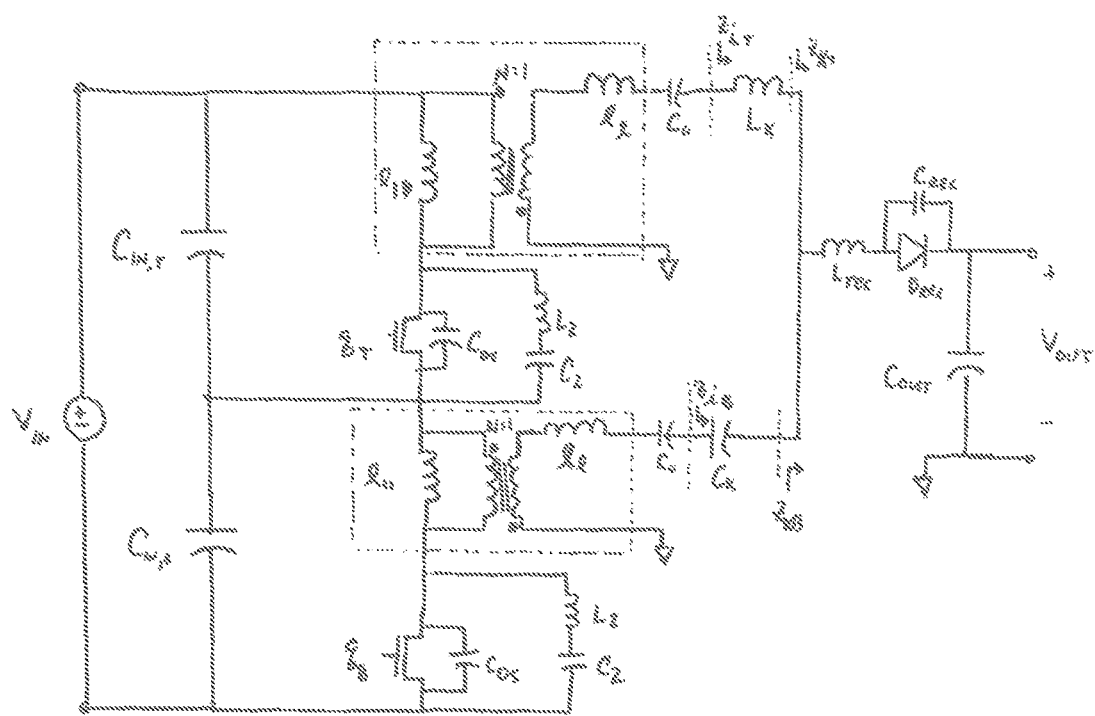
FIG. 26 is a schematic diagram of an embodiment of an ICR converter utilizing isolated phi-2 inverters and a single-device resonant rectifier. Here the impedance control network is formed by the Lx, Cx network. Note that this network can be absorbed as part of the remaining converter elements (e.g., Cx combined with Co in the bottom inverter, Lx combined with Il in the top inverter.) Likewise, in some implementations, rectifier inductance Lrec may represent only packaging or parasitic inductance, or it may be eliminated, or its function could be absorbed into the inverters (merging it into the ICN). Also, by eliminating the second-harmonic tanks (L2, C2) in each inverter and retuning, the inverters could be operated in class E or near class E mode. This provides lower component count but at higher inverter device voltage stress.

Thus, far only burst mode impedance control resonant (ICR) dc/dc converters have been illustrated. All the embodiments of the ICR converter discussed above can be converted into an inverter (dc/ac converter) having an ac output component at below the switching frequency by either incorporating an unfolding bridge at the output, as shown in FIG. 25, and/or by actively controlling the switches in the rectifier stage in such a way so as to also provide a lower-frequency inversion function. Such an inverter can also utilize BuMPS control. Likewise, by providing a rectifier at the input of the system, one can construct an ICR rectifier (or ac-dc converter). In this, the low-frequency variation of the rectified input is processed by the ICR converter operation with phase shift and burst-mode control used to regulate over a wide range of operating conditions While the techniques described here are readily implemented with conventional half-bridge or bridge topologies for the inverters and rectifiers, they may also be implemented with alternative inverter and rectifier structures (e.g., class E, class DE, class Phi, Class Phi-2 inverters and/or rectifiers, current-source inverters/current-doubler rectifiers, z-source inverters and/or rectifiers, etc.) Alternative resonant inverter and rectifier topologies may be particularly advantageous in systems where it is desired to operate at high frequencies (e.g., 2-30 MHz) or very high frequencies (e.g., >30 MHz) in order to achieve one or more of miniaturization, integration, and fast response of the converter. For example, FIG. 26 shows an embodiment utilizing class phi-2 isolated inverters and a single-device resonant rectifier. Here the impedance control network is formed by the Lx, Cx network.

The two phi-2 inverters are each implemented with a transformer having controlled parameters (modeled with an extended cantilever model in FIG. 26). The inverters are designed such that $I_l$ and $C_o$ are tuned at resonance at the switching frequency (suppressing the effects of inverter and rectifier voltage harmonics). L2 and C2 are tuned to be resonant at or near the second harmonic of the switching frequency (as typical with phi-2 inverters), and tuned with the remaining elements ($I_{11}$, $C_{DS}$) to provide the known desired drain impedance characteristics for a phi-2 inverter, under the assumption that impedances $Z_{iT}$ and $Z_{iB}$ take on appropriate impedance values (largely resistive) as controlled by the impedance control network. The resonant rectifier (including elements Lrec, Crec) is designed using known techniques to present a resistive impedance at its input (i.e., in a describing function sense) at the fundamental switching frequency. In some implementations, rectifier inductance Lrec may represent only packaging or parasitic inductance, or it may be eliminated, or its function could be absorbed into the inverters (merging it into the ICN). Likewise, capacitor Crec may represent only diode capacitance. The ICN is designed to provide the desired characteristics for operation (e.g., effective inverter loading impedances $Z_{iT}$, $Z_{iB}$) as the phase of the top and bottom inverters are varied, similar to other designs described herein.

Note that in this converter the ICN network can be optionally absorbed as part of the remaining converter elements (e.g., Cx combined with Co in the bottom inverter, Lx combined with I1 in the top inverter.) Likewise, in some implementations, rectifier inductance Lrec may be eliminated, or its function could be absorbed into the inverters (merging it also into the ICN). Also, by eliminating the second-harmonic tanks (L2, C2) in each inverter and retuning, the inverters could be operated in class E or near class E mode (zero-voltage switching at fixed duty ratio operation). This provides lower component count but at higher inverter device voltage stress. Similarly, other resonant rectifiers (such as a shunt-diode resonant rectifier) could be used in place of the series-diode resonant rectifier illustrated.

The techniques described herein are not limited to the specific embodiments described. Elements of different embodiments described herein may be combined to form other embodiments not specifically set forth above. Other embodiments not specifically described herein are also within the scope of the following claims.

What is claimed is:

1. An impedance control resonant (ICR) power converter having a converter input and a converter output, the ICR power converter comprising:
   a plurality of inverters, each of said plurality of inverters having an input coupled to the converter input, and each of said plurality of inverters having an output;
   one or more rectifiers, each of said one or more rectifiers having an input, and each of said one or more rectifiers having an output coupled to the converter output; and
   an impedance control network (ICN) having a plurality of inputs each coupled to a corresponding output of said plurality of inverters and said impedance control network having one or more outputs each coupled to a corresponding input of the one or more rectifiers, wherein said impedance control network causes the inverters to interact such that the switching frequency components of the individual inverter currents remain relatively close in phase to the corresponding individual inverter switching frequency voltages as the relative inverter phase angles change over a specified operating range, whereby the inverter switches turn off at currents that are less than half the peak switch currents,
   wherein said ICN is provided as an asymmetric combining structure disposed to provide interaction among the inverters such that the switching frequency components of the individual inverter currents remain substantially in phase with the corresponding individual inverter switching frequency voltage components as the relative inverter phase angles change.

2. The ICR power converter of claim 1 further comprising a burst mode controller coupled to said ICR power converter, said burst mode controller for operating the ICR power converter in accordance with a burst mode control strategy in which the operation of the ICR power converter is modulated on and off at a frequency lower than a switching frequency of the ICR power converter.

3. The ICR power converter of claim 2 wherein said burst mode controller modulates the ICR power converter on and off at a frequency which is one of:
   a factor of 5 or more lower than its switching frequency;
   a factor of 8 or more lower than its switching frequency; or
   a factor of 10 or more lower than its switching frequency.

4. The ICR power converter of claim 1 wherein said ICN includes:
   a first ICN input terminal;
   a second ICN input terminal;
   and a point of common coupling;
   a series reactive network having a net positive reactance at a switching frequency connected between said first ICN input terminal and said point of common coupling; and
   a series reactive network having a net negative reactance at a switching frequency is connected between said second ICN input terminal and said point of common coupling.

5. The ICR converter of claim 1 wherein said ICN comprises a parallel combiner coupled to a series resistance compression network.

6. The ICR converter of claim 1 wherein said ICN comprises:
   a transformer to galvanically isolate said plurality of inverters from said one or more rectifiers; and
   a pair of reactive branches having complementary reactance values at a switching frequency to improve alignment of individual inverter currents with corresponding individual inverter voltages.

7. The ICR converter of claim 6 wherein said ICN comprises a parallel Chireix-style combiner coupled to a parallel resistance compression network.

8. The ICR converter of claim 6 wherein said ICN comprises a series combiner coupled to a parallel resistance compression network.

9. The ICR converter of claim 6 wherein said ICN comprises a parallel combiner coupled to a series resistance compression network.

10. The method of claim 1 wherein the ICR is configured to operate the plurality of inverters with sinusoidal waveform currents.

11. The method of claim 1 wherein the ICR is configured so that the inverter switches turn off during commutation at currents of zero or close to zero.

12. The ICR power converter of claim 1 wherein the inverter switches turn off at currents that are zero or near zero.

13. A series-series impedance control resonant (ICR) power converter comprising:
   a plurality of inverters each of said plurality of inverters having an input and coupled to the ICR power converter input and each of said plurality of inverters having an output;
   one or more rectifiers each of said one or more rectifiers having an input and each of said one or more rectifiers having an output coupled to the converter output; and a resonant tank circuit coupled to each of said plurality of inverters;

a combiner network having complementary reactances, $j\omega L_c$ and $1/j\omega C_c$, in series with the inverter outputs, wherein the combiner is an asymmetric combiner disposed to provide interaction among the inverters such that switching frequency components of individual inverter currents remain close to in phase with corresponding individual inverter switching frequency voltage components as relative inverter phase angles change; and a series resistance compression network coupled to said combiner network.

14. The ICR power converter of claim 13 comprising further comprising input and output filtering capacitances.

15. The ICR power converter of claim 13 wherein said plurality of inverters are provided from a like plurality of controllable half-bridges.

16. The ICR power converter of claim 13 wherein said rectifiers are provided as diode half-bridges.

17. The ICR power converter of claim 13 wherein said rectifier devices can be provided from any non-controllable or controllable rectifying device.

18. The ICR converter of claim 13 wherein:

said resonant tank circuits for said inverters are provided from pairs of inductors $L_r$ and pairs of capacitors $C_r$;

the combiner network is provided from an inductor $L_c$ and a capacitor $C_c$; and said resistance compression network is provided from an inductor $L_s$ and a capacitor $C_s$; and said input filtering capacitance is provided from a first capacitor $C_i$ having one terminal coupled to an input terminal of the ICR converter and a second terminal coupled to ground and said output filtering capacitance is provided from a capacitor $C_o$ having one terminal coupled to an output terminal of the ICR converter and a second terminal coupled to ground.

19. The ICR power converter of claim 13 further comprising an additional network comprised of an inductive element which establishes a finite inductive component of impedance for said inverters.

20. The ICR power converter of claim 19 wherein said inductive element is provided from a plurality of inductors incorporated into the ICR converter by splitting an input capacitance and wherein said plurality of inductors establish a small but finite inductive component of impedance for said inverters.

21. The ICR power converter of claim 13 wherein said inverter is implemented with one of: a half-bridge topology; or a bridge topology.

22. The ICR power converter of claim 13 wherein said rectifier is implemented with one of: a half-bridge topology; or a bridge topology.

23. The ICR power converter of claim 13 further comprising an impedance control network (ICN) having a plurality of inputs each coupled to a corresponding output of said plurality of inverters, the ICN comprising:

a first ICN input terminal;

a second ICN input terminal;

and a point of common coupling;

a series reactive network having a net positive reactance at a switching frequency connected between said first ICN input terminal and said point of common coupling; and a series reactive network having a net negative reactance at a switching frequency is connected between said second ICN input terminal and said point of common coupling.

24. A method for controlling an Impedance control resonant (ICR) power converter provided from an impedance control network (ICN) coupled between two or more inverters and one or more rectifiers, the method comprising:

operating the ICR power converter at a fixed switching frequency;

operating the inverters at a fixed duty ratio with a phase shift between them and adjusting the phase shift depending upon at least one of input voltage and output voltage such that an admittance presented to the inverters is purely or near purely conductive;

utilizing the phase shift between the inverters to control output power or to compensate for variations in input or output voltage such that the ICR power converter operates at fixed frequency and achieves both zero voltage switching (ZVS) for turning inverter switches on and zero or near zero current switching (ZCS) for turning inverter switches off during inverter commutation; and providing interaction among the inverters such that switching frequency components of individual inverter currents remain close to in phase with corresponding individual inverter switching frequency voltage components as relative inverter phase angles change.

25. The method of claim 24 further comprising utilizing the impedance control network such that a susceptance presented to each inverter is: (1) constant as a function of output power, (2) negative and (3) arbitrarily small for a selected range of input and output voltages such that an input admittance seen by the inverters is substantially purely conductive across a desired output power range over a selected range of input voltages.

26. The method of claim 25 further comprising controlling output power by changing the phase shift between the inverters.

27. The method of claim 26 further comprising:

controlling output power below a value set by the phase shift by turning the converter on and off at a frequency which is lower than the fixed a-switching frequency of the ICR power converter.

* * * * *